US007756271B2

(12) United States Patent
Zhu et al.

(10) Patent No.: US 7,756,271 B2
(45) Date of Patent: Jul. 13, 2010

(54) SCALABLE LAYERED ACCESS CONTROL FOR MULTIMEDIA

(75) Inventors: Bin Zhu, Edina, MN (US); Min Feng, Sichuan (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1678 days.

(21) Appl. No.: 10/869,280

(22) Filed: Jun. 15, 2004

(65) Prior Publication Data
US 2005/0276416 A1 Dec. 15, 2005

(51) Int. Cl.
*H04N 7/167* (2006.01)
(52) U.S. Cl. ...................................... 380/200; 713/150
(58) Field of Classification Search .................. 713/201, 713/150; 714/781; 725/89; 455/186; 380/211, 380/200
See application file for complete search history.

(56) References Cited

U.S. PATENT DOCUMENTS

| 5,870,474 | A * | 2/1999 | Wasilewski et al. ......... 380/211 |
| 6,006,283 | A | 12/1999 | Hsieh et al. |
| 6,128,737 | A | 10/2000 | Jakubowski et al. |
| 6,182,214 | B1 | 1/2001 | Hardjono |
| 6,351,491 | B1 * | 2/2002 | Lee et al. ............... 375/240.03 |
| 6,392,705 | B1 | 5/2002 | Chaddha |
| 7,072,366 | B2 * | 7/2006 | Parkkinen et al. ........... 370/538 |
| 7,167,560 | B2 | 1/2007 | Yu |
| 2001/0001156 | A1 * | 5/2001 | Leppek ........................ 713/201 |
| 2002/0161847 | A1 * | 10/2002 | Weigand et al. ............. 709/213 |
| 2003/0021296 | A1 | 1/2003 | Wee et al. |
| 2004/0148634 | A1 * | 7/2004 | Arsenault et al. ............. 725/89 |
| 2005/0170799 | A1 * | 8/2005 | Strandberg et al. ......... 455/186.1 |

(Continued)

FOREIGN PATENT DOCUMENTS

EP 0766471 4/1997

(Continued)

OTHER PUBLICATIONS

Yan Sun and K. J. Ray Liu; Multi-Layer Key Management for Secure Multimediamulticast Communications; Year: 2004; University of Maryland; pp. 1-4.*

(Continued)

*Primary Examiner*—Kambiz Zand
*Assistant Examiner*—Monjour Rahim
(74) *Attorney, Agent, or Firm*—Lee & Hayes, PLLC

(57) ABSTRACT

A flexible framework for generating "scalable layered access" codestreams allows a bitstream architect to select the number of access types and the number of access layers within each access type. At least some of the access layers are encrypted (or scrambled). Some of the access layers may be left unencrypted or unscrambled to allow free access to those layers. The framework facilitates simultaneous access of multimedia content by different users enjoying selective decryption of different access types and different access layers. An exemplary key schema for the framework sends only one or only a few keys to an end user for a given access layer, from which decryption keys for the content can be derived by hashing and then combining under a Group Diffie-Hellman key agreement. In one implementation, only one key is sent in a license to an end user and other partial key information for Group Diffie-Hellman combination with the licensed key is included in the publicly distributed codestream.

45 Claims, 12 Drawing Sheets

U.S. PATENT DOCUMENTS

2007/0150794 A1* 6/2007 Naslund et al. ............. 714/781

FOREIGN PATENT DOCUMENTS

| EP | 0766471 | A1 | 4/1997 |
| EP | 1189432 | | 3/2002 |
| EP | 1189432 | A2 | 3/2002 |
| EP | 1271280 | | 1/2003 |
| JP | 2002 87628 | | 4/2002 |
| JP | 200287628 | | 4/2002 |

OTHER PUBLICATIONS

C Shi et al.; "An Efficient MPEG Video Encryption Algorithm" Proceedings of the 17th IEEE Symposium on Reliable Distributed Systems. SRDS 98. West Lafayette IN Oct. 20-23.

S. J. Wee et al.; "Secure scalable streaming enabling transcoding without decryption" Proceedings 2001 International Conference on Image Processing. ICIP 2001 Thessaloniki Greece Oct. 7-10, 2001: IEEE vol. 1 of 3. Conf 8 Oct. 7, 2001 pp. 437-440.

Shamir, "How to Share a Secret", retrieved on May 23, 2003, at <<http://szabo.best.vwh.net/secret.html>>, pp. 4.

Shi, et al., "An Efficient MPEG Video Encryption Algorithm" Proceedings of the 17th IEEE Symposium on Reliable Distributed Systems. SRDS 98. West Lafayette IN Oct. 20-23, 1998 IEEE pp. 381-386.

Wee, et al., "Secure scalable streaming enabling transcoding without decryption" Proceedings 2001 International Conference on Image Processing. ICIP 2001 Thessaloniki Greece Oct. 7-10, 2001: IEEE vol. 1 of 3. Conf 8 Oct. 7, 2001 pp. 437-440.

* cited by examiner

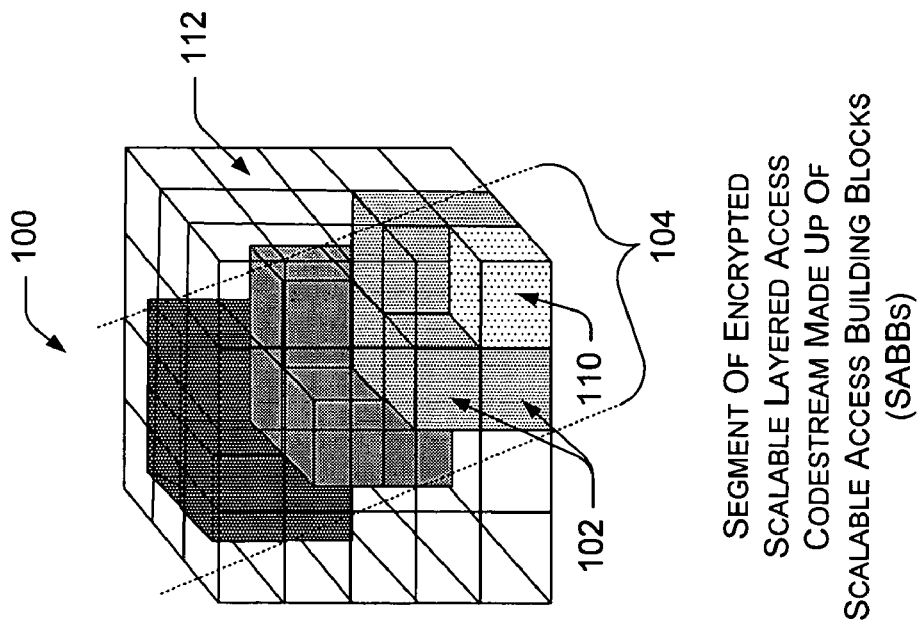
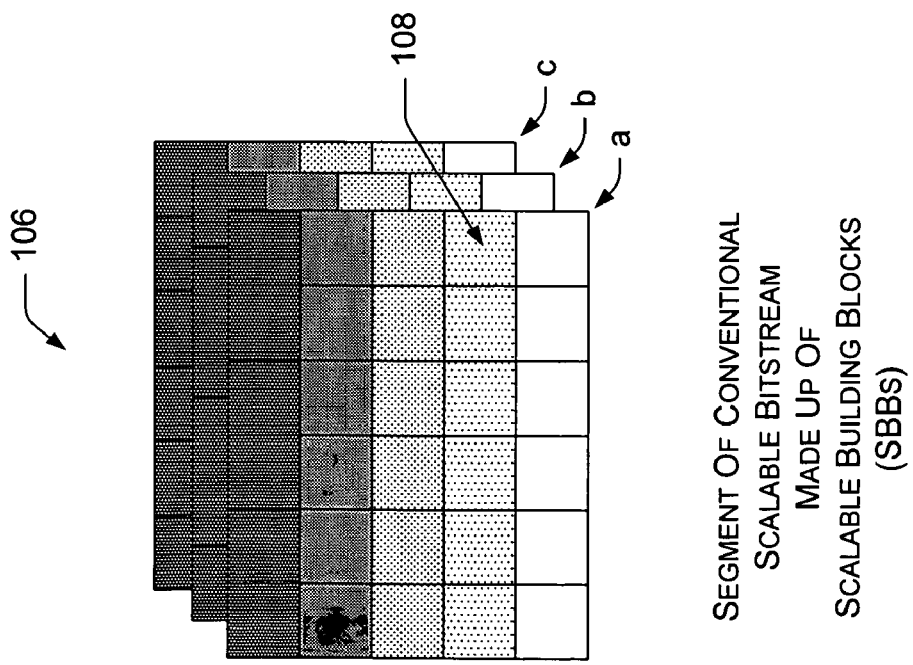
Fig. 1

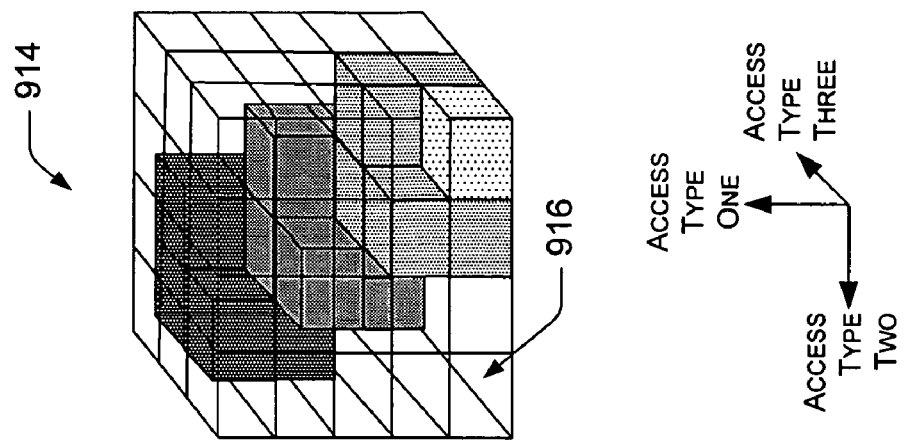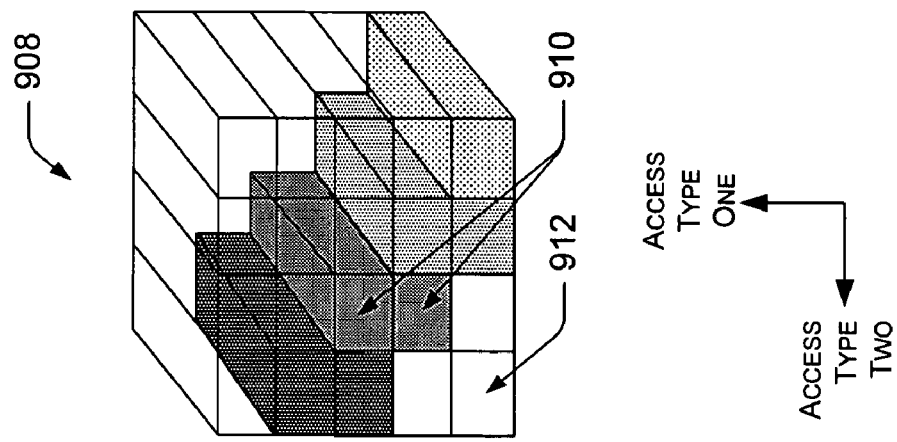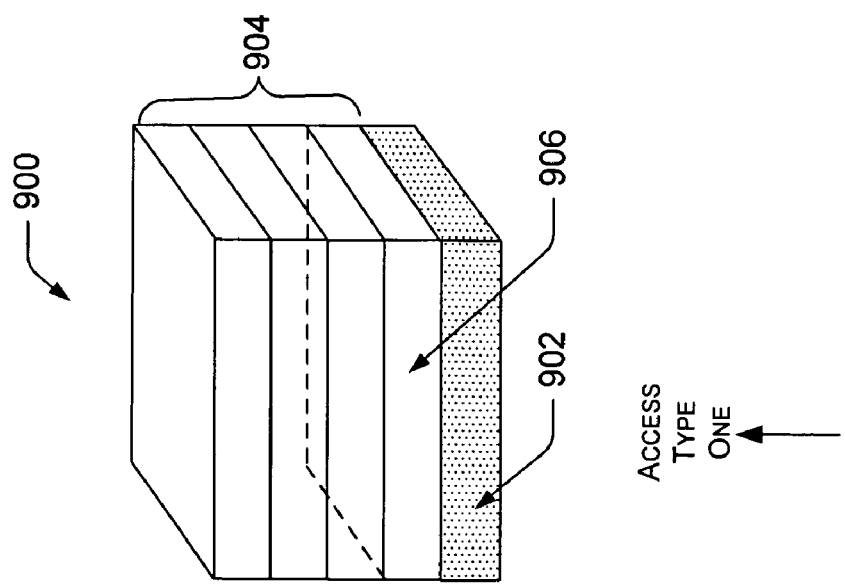
Fig. 9

SCALABLE LAYERED ACCESS CONTROL FOR MULTIMEDIA

TECHNICAL FIELD

This invention relates generally to scalable multimedia codestreams and more specifically to scalable layered access control for multimedia.

BACKGROUND

Scalable coding is a technology that encodes a multimedia signal in a scalable manner so that various representations of the content can be extracted from a single codestream to fit a wide range of applications. Many scalable coders have been proposed and some have been adopted as standards. JPEG 2000 (J2K) is a scalable wavelet-based image-coding standard that supports resolution, quality, and color-component scalabilities within a single codestream. MPEG-4 Fine Granularity Scalability (FGS) is a fine-grain scalable video coding standard that supports both temporal and quality scalabilities. The recent Universal Scalable Video Coding (USVC) proposal supports temporal, spatial, and quality scalabilities (F. Wu, S. Li, R. Yan, X. Sun, and Y. Zhang, "Efficient and Universal Scalable Video Coding," *IEEE Int. Conf. Image Processing*, September 2002, vol. 2, pp. 37-40). Embedded Audio Coding (EAC) supports quality, sampling-rate, and channel scalabilities (J. Li, "Embedded Audio Coding (EAC) with Implicit Auditory Masking," *Proc. 10th ACM Int. Conf. Multimedia*, December 2002, pp. 592-601).

Scalable codestreams are usually organized upon fundamental building blocks denoted as "scalable building blocks" (SBBs). For example, a J2K encoder partitions a codestream according to tiles, components, resolution levels, precincts, and layers. Thus, a J2K SBB is a type of data packet that can be uniquely identified by the aforementioned scalable parameters. Based on supported scalabilities, SBBs can be extracted from a codestream and accessed for use by any one of the scalable parameters to form a best-fit representation for an application. SBBs also have an advantage that they can be truncated or rate-shaped. The "compression-once-decompression-many-ways" characteristic of SBBs is very desirable in many applications.

Multimedia Digital Rights Management (DRM) seeks to manage ownership and distribution rights for multimedia content from its creation to its consumption. MPEG-4 has been actively developing a DRM standard, the Intellectual Property Management and Protection (IPMP) protocol. Several commercial DRM products are also currently available, such as MICROSOFT® WINDOWS MEDIA® RIGHTS MANAGER (WMRM) (Microsoft Corporation, Redmond, Wa.). A DRM system such as WMRM encrypts and packages digital media content into a digital media file for super-distribution. A decryption key can be uploaded to a license server along with a specification of license rights selected by the publisher. To play protected content, a user first acquires a license from the proper license server that contains the decryption key and user access rights. A license to use the content is individualized and typically encrypted in such a way that the key binds to the user's hardware, making it impossible for the license to be used by others illegally.

While there are many encryption algorithms proposed for non-scalable multimedia formats, few are designed specifically for scalable multimedia formats. Wee, et al., propose a secure scalable streaming (SSS) schema that enables transcoding without decryption. (S. J. Wee and J. G. Apostolopoulos, "Secure Scalable Streaming Enabling Transcoding Without Decryption," *IEEE Int. Conf. Image Processing*, 2001, vol. 1, pp. 437-440.) For MPEG-4 FGS, the approach encrypts video data in both base and enhancement layers except header data. Markers for RD-optimal (rate distortion-optimal) cutoff points have to be inserted into the unencrypted header for a middle stage to perform RD-optimal bit rate reduction. With regard to SSS, encryption granularity depends on the way a video stream is packetized. More precisely, encryption is applied to each packet. No modification on the packet size is allowed after encryption is done. SSS protects scalable media as a single access layer.

Grosbois et al. propose a simple layered access control schema for the image compression standard of JPEG 2000. (Raphael Grosbois, Pierre Gergelot, and Touradj Ebrahimi, "Authentication and Access Control in the JPEG 2000 compressed domain," *Proc. of SPIE 46th Annual Meeting, Applications of Digital Image Processing XXIV*, San Diego, 2001.) In this scheme, a J2K image codestream is divided into two layers: the unencrypted layer and the encrypted layer. For the access control on resolution, the scheme pseudo-randomly flips the signs of the wavelet coefficients in the high frequency subbands. For the access control on layers, the bits in the codewords of the coding-passes belonging to last layers are pseudo-randomly flipped. Both types of access controls cannot be supported simultaneously.

SUMMARY

A flexible framework for generating "scalable layered access" codestreams allows a bitstream architect to select the number of access types and the number of access layers within each access type. At least some of the access layers are encrypted (or scrambled). Some of the access layers may be left unencrypted or unscrambled to allow free access to those layers. The framework facilitates simultaneous access of multimedia content by different users enjoying selective decryption of different access types and different access layers. An exemplary key schema for the framework sends only one or only a few keys to an end user for a given access layer, from which decryption keys for the content can be derived by hashing and then combining under a Diffie-Hellman or Group Diffie-Hellman key agreement. In one implementation, only one key is sent in a license to an end user and other partial key information for Diffie-Hellman or Group Diffie-Hellman combination with the licensed key is included in the publicly distributed codestream.

BRIEF DESCRIPTION OF THE DRAWINGS

FIG. 1 is a graphic representation of a conventional scalable bitstream framework and an exemplary scalable layered access control (SLAC) codestream framework.

FIG. 9 is a graphic representation of various exemplary SLAC frameworks.

DETAILED DESCRIPTION

Overview

Figure 2:
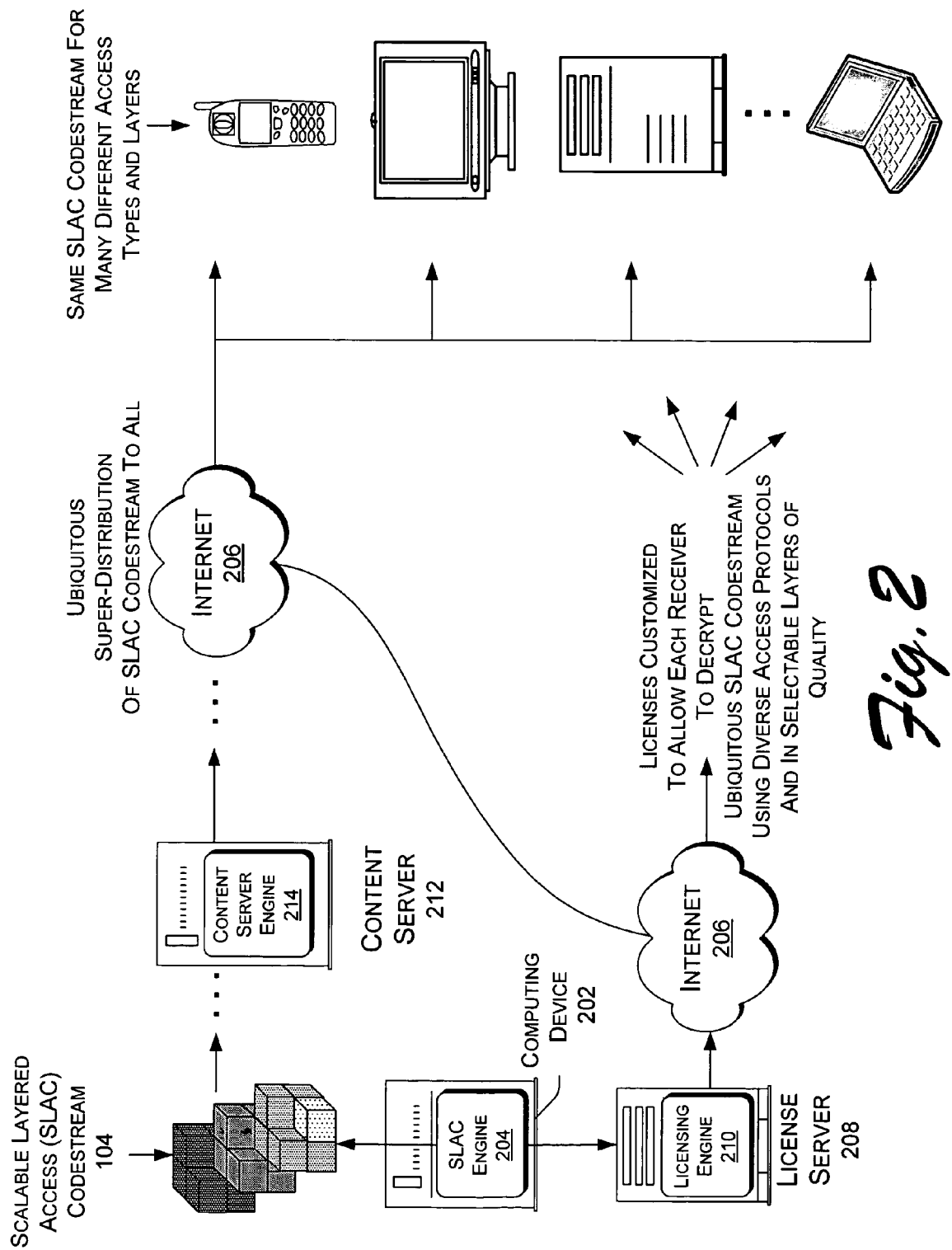
FIG. 2 is a block diagram of an exemplary (SLAC) system.

Referring to FIG. 1, the subject matter described herein includes flexible data structures, referred to herein as "scalable layered access control" (SLAC) frameworks 100, for providing security encrypted (or scrambled) scalable layered access codestreams 104. At least some of the access layers are encrypted (or scrambled). Some of the access layers may be left unencrypted or unscrambled to allow free access to those layers. The terms "encrypt" and its derivatives will be used loosely herein to represent encrypting or scrambling of the data segments of a codestream and the term "decrypt" and its derivatives will be used loosely herein to represent decrypting or descrambling of the data segments of a codestream. The term "codestream" as used herein means data, such as multimedia content, in transferable from, usually encrypted multimedia data suitable for transfer as a bitstream over a wire or other medium for codec processing. A SLAC codestream 104 can be selectively decrypted by access type, wherein access types form dimensions of a SLAC framework 100, and by access layer, wherein an access layer forms coordinates or degrees of intensity along each dimension of a SLAC framework 100.

The subject matter also includes exemplary SLAC security key schemata for efficiently locking and unlocking scalably encrypted data segments (scalable access building blocks, "SABBs," e.g., 110) of a SLAC codestream 104 that have been generated in accordance with a SLAC framework 100.

A SLAC encrypted codestream 104 can simultaneously support multiple different "access types," that is, modes of access to the multimedia content of the SLAC codestream 104. Each access type, in turn, can have a unique number of degrees of access ("access layers"). In other words, different consumers can simultaneously use different types of scalabilities to access the same single SLAC codestream 104, and each consumer can select which access layer—for example, which level of quality—to enjoy.

An exemplary SLAC framework 100, including an associated exemplary key schema, can exploit the Diffie-Hellman (DH) or Group Diffie-Hellman (GDH) key exchange protocol and variations thereof to reduce the number of keys that must be tracked and sent privately to digital rights consumers of protected multimedia content. In the rest of this description, GDH will mean either DH or GDH, depending on the number of access types to be supported, unless explicitly stated otherwise. key exchange is a cryptographic protocol that allows a group of communicators, each having a partial group key, to arrive at a secret group key even over a fully public, sometimes insecure, communications means. In this case, the group of communicators is made up of the access layers of the SLAC codestream 104 itself and the public communications means can be, in part, the SLAC codestream 104 itself. That is, each access layer of an exemplary SLAC framework 100 is afforded a GDH partial group key. One GDH partial group key from each relevant access layer is needed to generate a single, final, GDH group key for encrypting and decrypting the particular segment of actual data—the particular SABB.

One partial group key from each relevant access layer is needed because a data segment may lie on multiple access layers at once, i.e., one access layer of each access type. Many of these multiple keys needed to generate a final GDH group key can be sent as information in the SLAC codestream 104 itself. Alternatively, a few keys can be sent separately such as in a license, and multiple keys can be derived from these by hashing on the client side.

In one implementation, using a GDH protocol, keys for access types and access layers the consumer has not subscribed to can be sent as key information in the SLAC codestream 104 itself. Then, only the key for the access type and access layer the consumer has subscribed to needs to be sent in a license, and can be combined with the key information in the SLAC codestream 104 on the client side to generate the single key for decrypting the particular segment of actual data. In other words, the GDH key exchange protocol, and variations thereof, is ideal for maintaining codestream security while reducing the number of keys to be sent in licenses.

The scalability and customizability of codestreams 104 created under a SLAC framework 100 and the ability of a SLAC codestream 104 to publicly carry much of the decryption key information make SLAC codestreams 104 ideal for super-distribution, that is, free dissemination in the public domain by all means available. To allow access, a content owner sends only a single key or a relatively small amount of secret information to a consumer to unlock a given access type and access layer.

For comparison, in the illustrated conventional scalable bitstream 106, each of three illustrated planes "a," "b," and "c," represent an "access type" for receiving and playing the unencrypted conventional scalable bitstream 106. For example, one access type might be bit rate access while another access type might be PSNR. The layers of each illustrated conventional plane represent access layers within each access type of the conventional scalable bitstream 106. For example, if an access type is bit rate, then a low access layer might be low bit rate access yielding a crude visual image of video content while a high access layer might be a high bit rate access yielding a better visual image.

In the illustrated exemplary SLAC codestream 104, each of the three access types that were represented by planes "a," "b," and "c," in the conventional scalable bitstream 106 are reconfigured in an encrypted form and represented as an axis or a dimension of an exemplary SLAC framework 100. An exemplary SLAC framework 100 is a flexible model for providing layered encryption of a multimedia codestream, while maintaining all the scalabilities of a conventional scalable bitstream 106.

Although three dimensions and therefore three access types are illustrated in the exemplary SLAC framework 100 in FIG. 1, other exemplary SLAC frameworks 100 can support more than three (or less than three) access types, with corresponding changes to the number of dimensions and thus to the structure of the exemplary SLAC framework 100. Moreover, each access type can have its own unique number of access layers, creating a great variety of possible data structure geometries for a SLAC framework 100. These geometries are selectable by the multimedia content owner.

A conventional scalable bitstream 106 can accommodate multiple access types using "atomic" units or segments of data known as SBBs (e.g., 108) that are adaptable to being accessed by different equipment and different protocols. An exemplary SLAC codestream 104, however, provides layered encryption for scalable codestreams using (encrypted) SABBs (e.g., 110). A SABB 110 in a SLAC framework 100 is data that can be theoretically "sliced" in different ways. The boundaries of exemplary SABBs 110 in a SLAC framework 100 are typically determined by the user-selectable number of theoretical ways of slicing the data, that is, the number of access types and access layers selected by a content owner for a particular SLAC codestream 104.

It should be noted that an exemplary SLAC codestream 104 is not the same as the SLAC framework 100 under which it is arranged. A SLAC codestream 104 consists of real data, whereas a SLAC framework 100 is a data structure model that may have virtual access layers not actually accessible by a user. Moreover, some of the theoretical data segments (e.g., 112) that would represent SABBs are typically empty of data. On the other hand, it should also be noted that in some circumstances the actual data contained in an exemplary SABB 110 and a corresponding conventional SBB 108 may be the same. However, this is not usually the case.

An exemplary key schema for a SLAC framework 100 can be summarized as follows. For each access type supported by a SLAC codestream 104, an independent random number is assigned to the highest access layer of that access type and serves as the "type key" for that access type. Within an access type, the type key is hashed to generate the second highest key for the second highest access layer, and in turn, this key too is hashed to derive the key for the third highest layer, and so on as needed down to the lowest access layer. Once layer keys are obtained for all the framework levels to which an individual SABB belongs, then a SABB key is generated for encrypting and decrypting the SABB by combining the multiple layer keys in a Group Diffie-Hellman (GDH) key agreement to produce a "group GDH" SABB key.

In an alternative exemplary key schema, a virtual layer, which does not correspond to any layers that a customer can physically access, is generated for each access type. A virtual layer is treated as if it were a higher layer of the highest access layer of that access type, and the type key is associated with this virtual layer. The layer key for the highest access layer of an access type is generated by hashing the virtual layer key of that access type. A virtual layer key is used in a GDH key agreement to generate a SABB encryption key if the SABB does not contain any "physical" access layer of the access type that the virtual layer belongs. In this way, a SABB key is generated by using exactly one layer key from each access type, no matter how many access types the SABB data belongs to.

GDH key exchange is a cryptographic protocol that allows a group of communicators to arrive at a secret group key even over a fully public, insecure, communications means. This means that a SLAC codestream 104 using GDH key exchange can establish secret key information between server and client, even though the SLAC codestream 104 itself is freely distributed in the public domain. GDH partial key information can be sent in the public multimedia content of a SLAC codestream 104 in order to establish many of the layer keys needed to decrypt data of an access layer on the client side. This allows a license server 208 to manage and send only a minimum number of secret keys. The public GDH partial keys, however, do not work for a client who cannot complete a Diffie-Hellman group key with the complementary licensed key sent by the license server 208.

To decode a SLAC codestream 104 on the client side, a type key for each access type supported by the SLAC codestream 104 may be needed, either from within a discrete license or, in some implementations, indirectly as public GDH partial key information in the SLAC codestream 104 itself. In this latter implementation, smaller number of keys or only one key has to be sent to a user to be combined with the public key information in order to unlock the user's licensed access layer.

SLAC Framework 100 for Generating Exemplary SABBs 110

An exemplary SLAC framework 100 provides security of proprietary content while preserving important scalabilities in the single encrypted SLAC codestream 104. This preservation of scalabilities in the codestream's encrypted form enables an application to select a best-fit representation without having to decrypt the codestream.

An exemplary SABB 110 can be roughly conceptualized as an encrypted version of a conventional SBB 108, although the properties of a SLAC framework 100 usually result in a SABB 110 having different data structure properties than a corresponding unencrypted SBB 108. Even so, SABBs 110 provide building blocks for creating the same layered scalability advantages in an encrypted SLAC codestream 104 as conventional SBBs 108 provide for an unencrypted codestream 106.

Since SBBs 108 and SABBs 110 have a similar purpose, namely providing scalability while providing diverse access, a SLAC codestream 104 consisting of SABBs 110 provides not only encryption and decryption scalability but also provides other conventional scalabilities of a conventional scalable bitstream 106. These conventional scalabilities allow a SLAC codestream 104 to behave with the advantages of a conventional scalable bitstream 106 even in the encrypted state. For example, a network device does not have to decrypt a SLAC codestream 104 consisting of SABBs 110 in order to determine the various access types and access layers (e.g., 102) contained therein and to properly route them. An exemplary SLAC codestream 104 can undergo transcoding and rate shaping without decryption. Security is provided by not having to share encryption secrets with middle stages (e.g., network servers and devices) during delivery of a SLAC codestream 104 from content owner to user.

As data building blocks that constitute the data of a SLAC codestream 104, SABBs 110 allow codestream data to be simultaneously accessible via different access types and access layers so that the multimedia content can be unlocked (decrypted, decompressed, and "played," etc.) on many different kinds of equipment, if the equipment owner possesses a key for a relevant access type and access layer. A SLAC framework 100, then, includes a variable data structure customizing SABBs 110 for different access types and access layers according to the tastes of a content owner, and also includes a key derivation system to lock and unlock SABBs 110 according to licenses granted by a content owner.

As shown in FIG. 2, a single encrypted SLAC codestream 104, created according to a SLAC framework 100, can simultaneously support different access types. For example, in one implementation the access types simultaneously supported are bit rate access and PSNR access. In other implementations, a selectable number of other access types are available. These can be the same access types as codified in a standard for unencrypted scalable codestreams 106. Each access type supported by a SLAC codestream 104 can have a variable number of encrypted access layers (e.g., 102). An encrypted access layer 102 is a degree of access to the content of the SLAC codestream 104 (within one of the access types) that has SABBs that can be unlocked with a security key proper to that encrypted access layer 102.

In the exemplary SLAC system of FIG. 2, a computing device 202 hosts an exemplary SLAC engine 204. A network, such as the Internet 206 provides communicative coupling for the computing device 202 and SLAC engine 204 as well as a license server 208 that includes a licensing engine 210 and a content server 212 that includes a content server engine 214. The exemplary SLAC engine 204 generates a single SLAC codestream 104 which can be loaded to the content server 212. The corresponding keys and access information can be loaded to the license server 208, which provides licenses to users. Although in the illustrated SLAC system of FIG. 2 the SLAC engine 204 resides in a generic computing device 202, in other implementations of a SLAC system the exemplary SLAC engine 204 may be discrete, or may be included in a content server 212 or in a license server 208. The SLAC engine 204 may also be integrated within the fabric of a licensing engine 210 or a content server engine 214. A content server 212 can also be combined with a license server 208. Other components, such as a payment server (not shown in FIG. 2) or other servers may also be included in a SLAC system. The SLAC system may also include several diverse users who are directly or indirectly coupled with the network.

Although a super-distribution is used as the context for the illustrated SLAC system, a SLAC codestream 104 can be distributed under other distribution models. Each diverse user is offered a variety of access types and layers, which makes the SLAC codestream accessible to many types of equipment and many different protocols. A user requests permission to access the desired access type and quality layer, e.g., by subscribing. Many protocols can determine a best access type to request without decrypting the SLAC codestream 104.

Corresponding rights descriptions and a key or keys to access a particular access layer of the encrypted content are sent to the user. The user typically pays a fee and downloads the desired license containing a key from the license server 208. In one implementation, one key for each access type supported by the SLAC codestream 104 is included in a license to the user, instead of numerous layer keys. If a SLAC codestream 104 supports three access types, then in this implementation only the three type keys are maintained and managed by a license server. Layer keys for any specific layer(s) are derived from the type keys. The key(s) corresponding to the highest layer(s) subscribed to by a user is (are) sent to the user. The keys of lower layers are derived from the delivered layer keys. In implementations where virtual layers are used, keys of virtual layers are never sent to a user. Instead, the "public" GDH keys of these virtual layer keys are sent to users in the SLAC codestream or by other public or private channels. In the same or another implementation, decrypting a user's content requires key information for each access type supported by a particular SLAC codestream 104, but only one key per access type subscribed to by the user needs to be sent to the user. Since a user typically only subscribes to one access type, this usually means that only one key needs to be sent to a user. The other type keys and/or layer keys needed to unlock SABBs 110 within a SLAC codestream 104 are embedded or added in the form of public GDH key information to the multimedia content itself. Although the embedded or added key information is public, it will not work unless used with the one key licensed to the user for each particular access layer. A group Diffie-Hellman (GDH) key exchange protocol is employed to provide security and so that licensed keys as well as embedded public key information are both needed to unlock licensed content.

In some implementations, a SLAC codestream 104 contains an unencrypted "free-of-charge" access layer so that before making a decision to purchase a license for a higher access layer, the user may view this free "lowest quality" access layer. After obtaining a license for a particular layer of a certain access type, the user can immediately enjoy the multimedia if the codestream is already in the user's possession or, the user may have to download more of the SLAC codestream 104 if the user has only downloaded a free part of the SLAC codestream 104, etc.

Exemplary SLAC Engine 204

Figure 3:
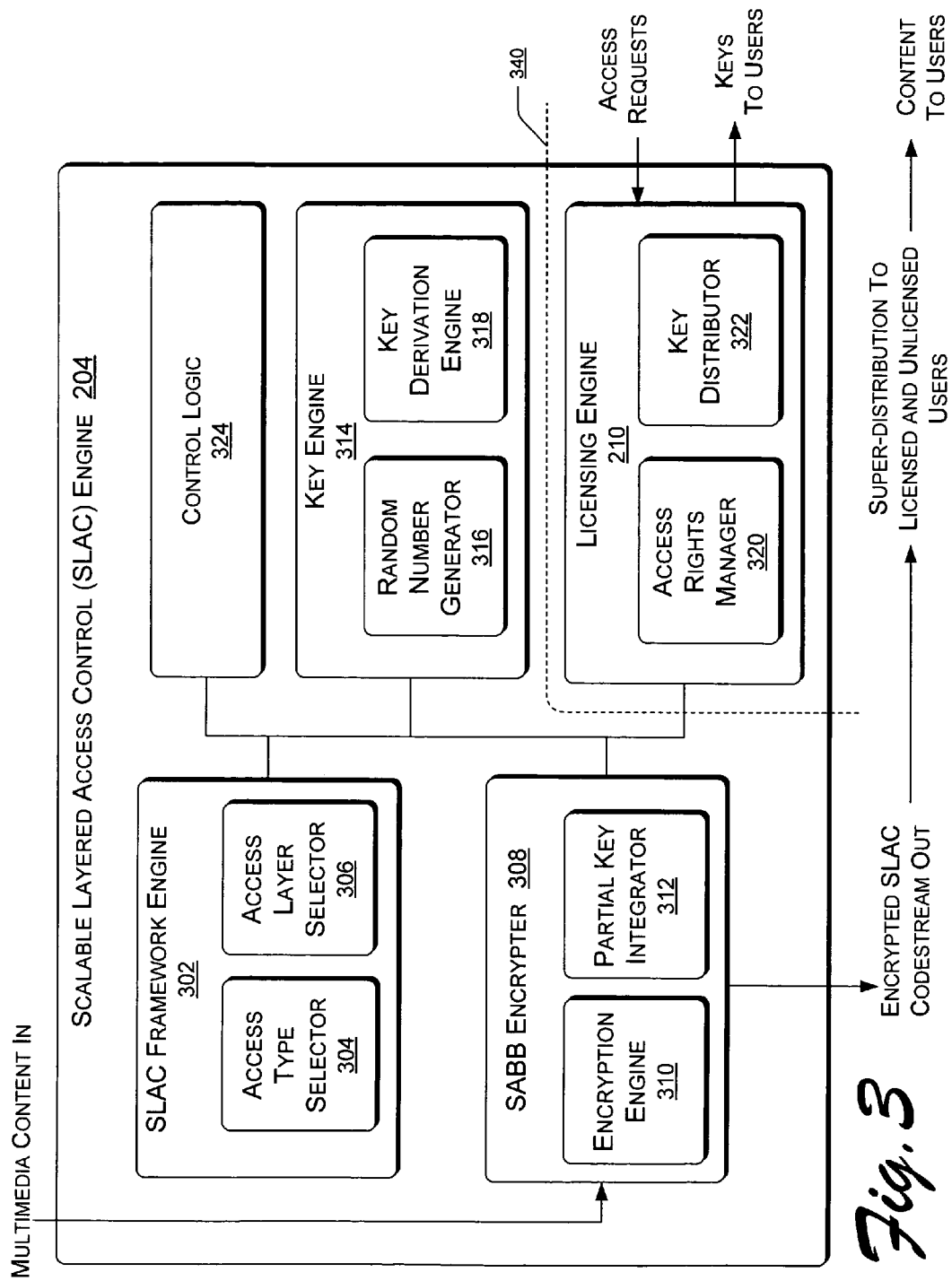
FIG. 3 is a block diagram of an exemplary SLAC engine.

FIG. 3 shows the exemplary SLAC engine 204 of FIG. 2 in greater detail. In one implementation, the exemplary SLAC engine 204 has a framework engine 302 that includes an access type selector 304 and an access layer selector 306. The framework engine 302 allows selection by a multimedia content owner of the geometry (types and layers) of a SLAC framework 100. A framework engine 302 may also adopt a standard framework, e.g., the number of access types and access layers in a J2K framework, etc.

A SABB encrypter 308 performs the actual encryption of multimedia data and other information into a SLAC codestream 104. In one implementation, the SABB encrypter 308 has an encryption engine 310 that uses encryption techniques, such as the Scalable Multi-Layer FGS Encryption (SMLFE) techniques described in U.S. patent application Ser. No. 10/405,973 entitled, "Scalable Error Resilient DRM for Scalable Media" to Bin Zhu et al, which is incorporated herein by reference in its entirety. An exemplary encryption engine 310 may use a low complexity encryption algorithm by Jakubowski and Venkatesan called "C&S encryption," which is used, with some modification, to encrypt each independently encrypted block of data. (Mariusz H. Jakubowski, Ramarathnam Venkatesan, "The Chain & Sum Primitive and Its Applications to MACs and Stream Ciphers", *EUROCRYPT '98*, pp. 281-293, 1998, incorporated herein by reference). C&S encryption denotes universal block chaining with sum, or, chain and sum primitive (C&S for short), which can be applied to the combination of encrypting and authenticating data. The primitive is a weak CBC-type encryption along with a summing step, and is used as a front end for stream ciphers to encrypt blocks of data in a video stream.

Even though an exemplary encryption engine 310 encrypts large amounts of data, the encryption need be applied only once since intermediate servers and network devices can perform processing directly on the SLAC codestream 104 without decryption in most cases. Since the C&S encryption is of low complexity, encryption and decryption are fast. The encryption applied by an exemplary encryption engine 310 usually causes no degradation to compression efficiency or effort resilience.

In other implementations, an exemplary encryption engine 310 can encrypt a frame or cell by replacing all or part of the C&S scheme with a generic stream cipher, such as RC4, etc. or a block cipher, such as DES, AES, RC5, etc, in various modes, such as ECB (Electronic Codebook), CBC (cipher block chaining), or OCB (Offset Codebook) modes.

In the exemplary C&S encryption algorithm, the original DES encryption of the pre-MAC (message authentication code) is replaced by RC5 encryption for speed. This encryption method does not increase the data size. Exemplary C&S encryption uses a reversible MAC to replace part of the data to be encrypted. The MAC value is used together with the encryption key to feed into a stream cipher like RC4 to encrypt the rest of the data. (The pre-MAC, as mentioned, is encrypted by RC5 to form the MAC.) Since the MAC is reversible, the encryption process can be reversed to get the original plaintext back if no bit errors occur.

An exemplary SABB encrypter 308 may also include a partial key integrator 312 to embed or add key information in the multimedia content for encryption in a SLAC codestream 104.

A key engine 314 included in the SLAC engine 204 generates the various keys for encryption and decryption of a SLAC codestream 104'; the keys to be sent by a license server 208 to a user; and also the partial GDH keys or key information to be embedded and/or added to multimedia content, in some implementations. A random number generator 316 creates an independent random number "type key" for assignment to the highest access layer in one implementation and the virtual layer in another implementation of a given access type. A key derivation engine 318 generates layer keys for the layers of a given access type from the type key. From the layer keys, the key derivation engine 318 also derives SABB keys for encrypting and decrypting individual SABBs 110. The key derivation engine 318 will be discussed in greater detail with respect to FIG. 4.

An exemplary licensing engine 210 may include an access rights manager 320 and a key distributor 322. The rights manager 320 keeps track of user subscriptions and privileges and the key(s) that a user is entitled to receive. The key distributor 322 may request from the key engine 314 a key to fulfill a user's access rights and may package the key in a license to be sent to the user with a description of access rights from the access rights manager 320. As mentioned above, the licensing engine 210 may be integrated in a SLAC engine 204 or may be discrete (represented by dashed line 340) in a remote license server 208.

An exemplary SLAC engine 204 as just described may be communicatively coupled with control logic 324 as shown. It should be noted that an exemplary SLAC engine can be hardware, software, or combinations thereof. The illustrated SLAC engine 204 is only one implementation presented for the sake of example.

Figure 4:
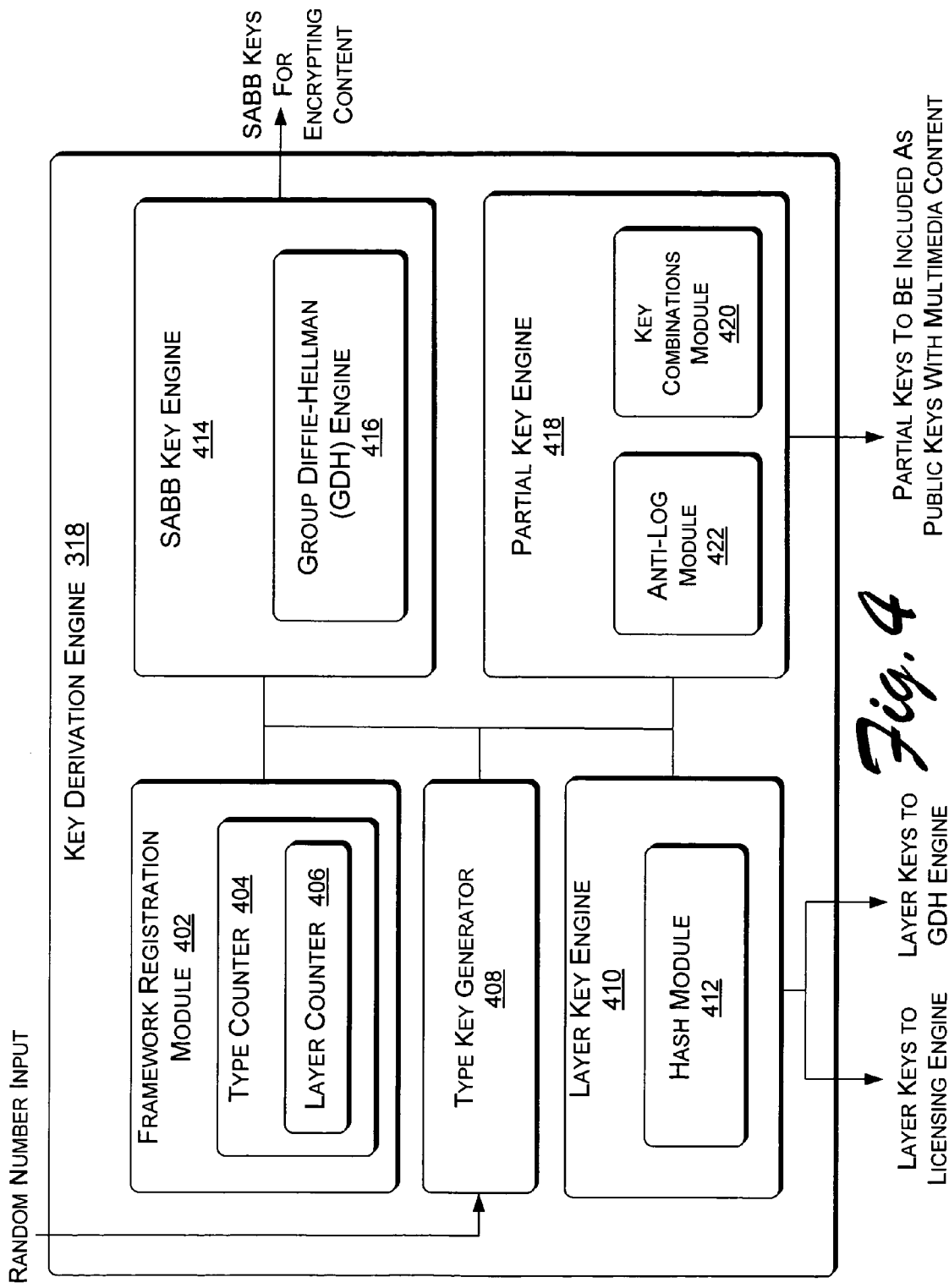
FIG. 4 is a block diagram of an exemplary SLAC key derivation engine.

FIG. 4 shows the exemplary key derivation engine 318 of FIG. 3 in greater detail. Description of an exemplary SLAC key schema that can be implemented by a key derivation engine 318 accompanies description of FIGS. 5-6.

In FIG. 4, framework registration module 402 keeps track of the geometry of a SLAC framework 100 in current use. The access types determined by the access type selector 304 and the access layers for each type determined by the access layer selector 306 may be tracked by a type counter 404 and layer counter 406 for purposes of key derivation, if the selected SLAC framework 100 does not comply to a codestream standard.

A type key generator 408 receives the independent random numbers from the random number generator 316 (in FIG. 3) assigning them to one key for each access type. In one implementation without virtual layers, a type key is assigned to the key of the highest access layer of the access type. In another implementation with virtual layers, a type key is assigned to the key of the virtual layer of the access type, and the key of the highest layer is derived from the key of the virtual layer in the same way as a layer key is derived from the key of its next higher layer. In the latter implementation, a virtual layer may be conceptually considered as a layer next to but higher than the highest "physical" layer of the same access type. A virtual layer does not contain any multimedia data. Thus, a virtual layer is used only for key generation. The two implementations just described are conceptually similar or the same if a virtual layer is thought of as the theoretically highest layer for an access type in the key schema but never accessed directly by a user. For simplicity, the two different implementations will not be differentiated in this description. The first implementation will be used to represent both implementations unless stated otherwise in the following description. The type keys, then, serve as the basis, either directly or indirectly, for deriving other intermediate keys for encrypting and decrypting SABBs 110.

A layer key engine 410 includes a hashing module 412 to generate the layer keys within an access type by hashing the type key, and iteratively repeating the process, hashing the results of the previous hash multiple times if necessary. Thus, if an access type has four layers, then the type key is hashed to obtain the second layer key for the second highest access layer, and this second layer key is hashed in turn to obtain the third layer key, etc. Conventional irreversible hash functions and formulations can be used in the hashing module 412.

A SABB key engine 414 includes a Group Diffie-Hellman (GDH) engine 416 to produce SABB keys from layer keys. A SABB key is generated by combining layer keys: a layer key of each access type, i.e., the levels to which the data of a SABB belong within a SLAC framework 100. If a SABB does not contain any data from any layers of a type, the virtual layer key of the access type is used in the SABB's key generation. From these multiple layer keys, a SABB key engine 414 generates a single SABB key by Group Diffie-Hellman agreement. To elucidate how SABB keys are derived from layer keys, an explanation of how a SABB is "situated" in a SLAC framework 100 model is presented next.

Figure 5:
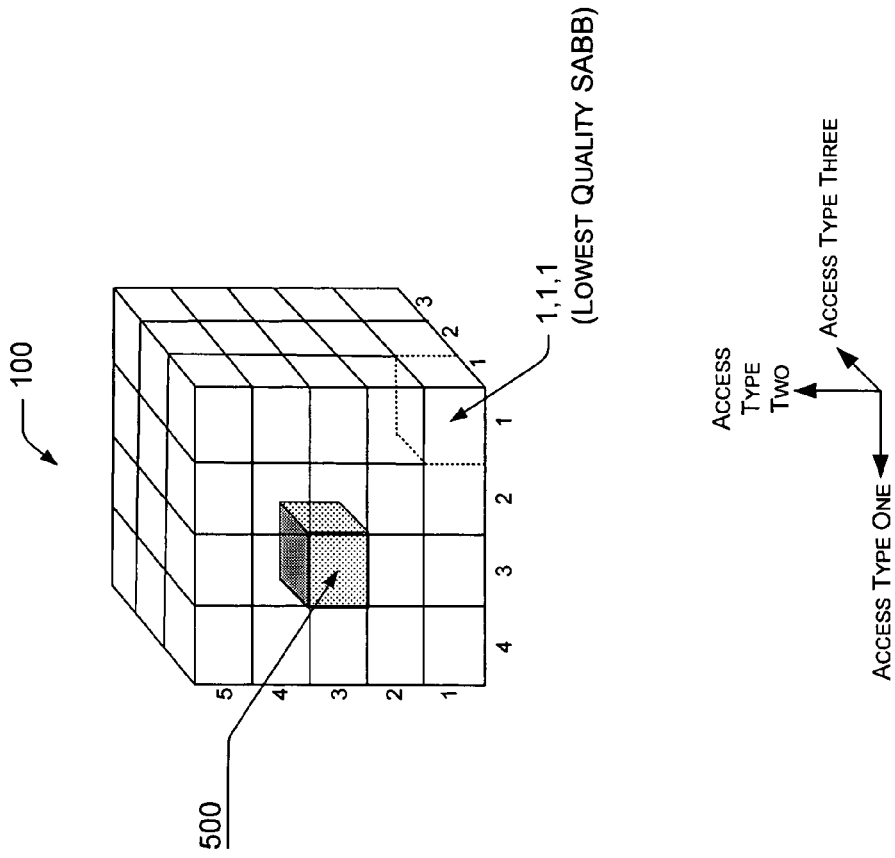
FIG. 5 is a graphic representation of exemplary SLAC key derivation.

As shown in FIG. 5, a SABB, such as SABB 500, is a data building block that resides at certain coordinates—theoretical access type and access layer coordinates—of a SLAC framework 100. The boundaries of SABBs are determined by how many access types and access layers "slice" the data. In other words, SABBs 500 are data segments addressable by different access types that may lay on one or more common access layers of the multiple access types. If the illustrated orthogonal SLAC framework 100 has a coordinate system determined as shown by its access types and access layers, then the proper framework levels for determining keys to combine to make a SABB key 500 can be determined from the coordinate system. The illustrated SLAC framework 100 has a first access type with four access layers; a second access type with five access layers, and a third access type with three access layers. For SABB 500, layer keys to combine to make a SABB key include a key for the second highest access layer of the first access type; a key for the third highest access layer of the second access type; and a key for the third highest access layer of the third access type.

Figure 6:
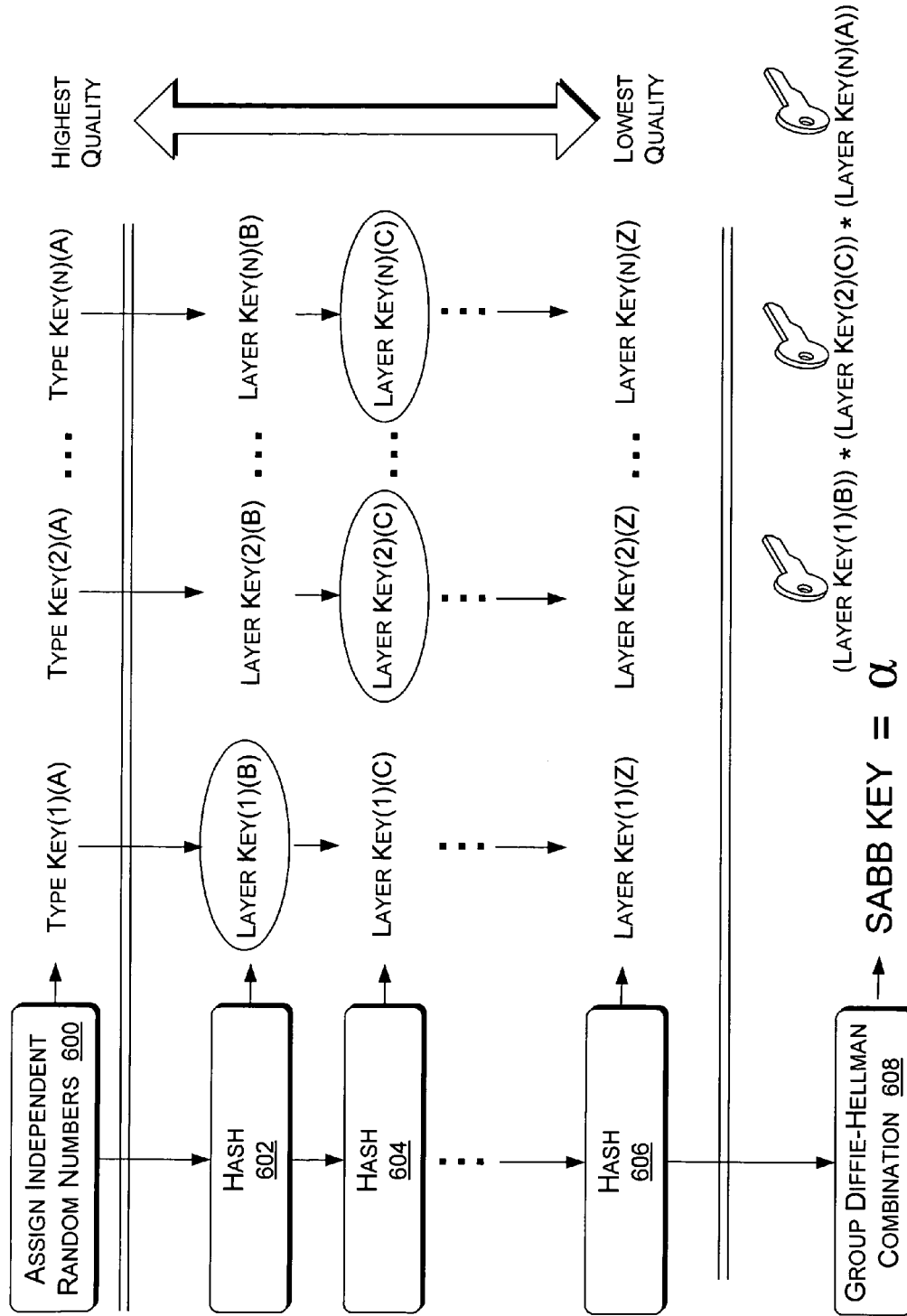
FIG. 6 is a flow diagram of an exemplary SLAC key schema.

FIG. 6 shows an exemplary key derivation schema that can be implemented by a key derivation engine 318. In the schema, some of the operations are summarized in individual blocks. Thus, at block 600, in a SLAC framework 100 having 1 to N access types and 1 to Z access layers, independent random numbers are assigned as keys (i.e., type keys) to the highest access layer of each access type.

At block 602, the type keys assigned at block 600 are each hashed to generate a layer key for the second highest access layer for each access type. At block 604, the layer keys derived at block 602 are each hashed in turn to generate a layer key for the third highest access layer for each access type. At block 606, the layer keys derived at block 604 are each hashed to generate a layer key for the fourth highest access layer for each access type. The process of deriving layer keys by hashing a layer key of a next higher layer repeats until layer keys at the framework levels occupied by a SABB 500 are reached.

At block 608, layer keys associated with the framework levels on which a SABB 500 resides are used as exponents in a Group Diffie-Hellman key agreement. This yields a single SABB key 610 used to encrypt and decrypt the particular SABB 500. Rather than deriving layer keys and SABB keys on the server side and sending a plethora of these keys to an end user, a client-side key derivation engine 700, to be discussed below with respect to FIG. 7, can be used to derive keys on the client side. In one implementation, only the keys of the highest layers subscribed are sent to an end user and SABB keys are derived on the client side by a client-side key derivation engine 700. In another implementation, only one key needs to be sent via license to an end user.

Referring back to the key derivation engine 318 of FIG. 4, a partial key engine 418 may embed and/or add combinations of GDH partial keys into the multimedia content to be encrypted and publicly distributed. GDH partial keys and/or partial key combinations may be public key information, but are in themselves unable to unlock a SABB 110 without a compete set of layer keys/GDH partial keys with which to compute the group key (i.e., a particular SABB key). When a license server 208 sends a single type key to an end user, derived GDH partial key information for access types to which the end user has not subscribed, but which are needed to derive the GDH group SABB key, may be combined first, before inclusion in the multimedia content to undergo encryption, so that most of the GDH computational work is already accomplished before the user even receives the SLAC codestream 104.

Accordingly, in one implementation, a key combinations module 420 computes which layer keys that the user has not subscribed to are needed as GDH exponents to derive SABB keys for SABBs 110 that the user has subscribed to. This GDH exponent information can be sent to the user within the multimedia content in various ways, depending on how much of the computational workload of performing key derivation calculations is to be done on the server side and how much is to be done on the client side, as mentioned.

Figure 7:
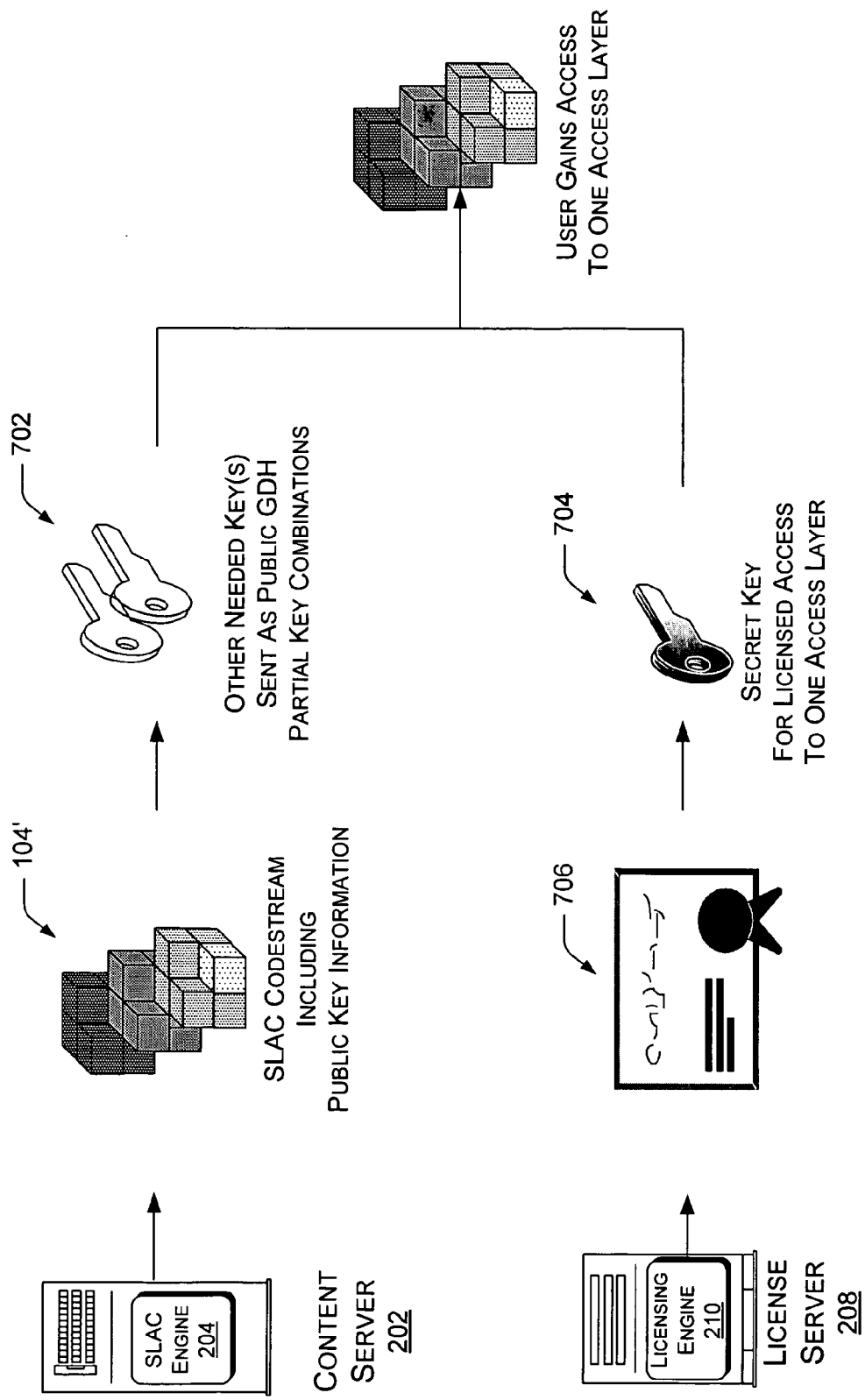
FIG. 7 is a graphic representation of an exemplary SLAC key distribution schema.

As shown in FIG. 7, in one implementation, GDH exponential combinations of layer keys except the final key in GDH key agreement are sent publicly within a SLAC codestream 104' as GDH partial key combinations 702 and the user's equipment performs the derivations of SABB keys directly from the layer keys and these GDH partial key combinations 702. In one implementation, an anti-logarithm ("anti-log") module 422 on the server side performs exponentiation of a selected Diffie-Hellman generator "α" raised to the power of one or more of the layer key values to obtain a GDH partial key combination 702 in the form of one or more anti-logarithms. These anti-logarithms are sent within or accompanying the multimedia content (i.e., SLAC codestream 104') and provide, for example, GDH partial keys that can be used immediately (without much preprocessing) on the client side to calculate SABB keys. In an exemplary key schema using a specific GDH key agreement (expressed in Equation (2) to be discussed later), a user need only raise a received anti-logarithm to the power of the private layer(s) key 704 that the user has received in a license 706 in order to generate a SABB key from one or more partial GDH group keys represented in the anti-logarithm.

If the key combinations module 420 has pre-calculated anti-logarithms for all possible partial keys or the most popular partial keys to complement the most popularly subscribed access types and access levels, and these are included in a super-distributed SLAC codestream 104, then the work of a license server 208 is greatly simplified and reduced.

Figure 8:
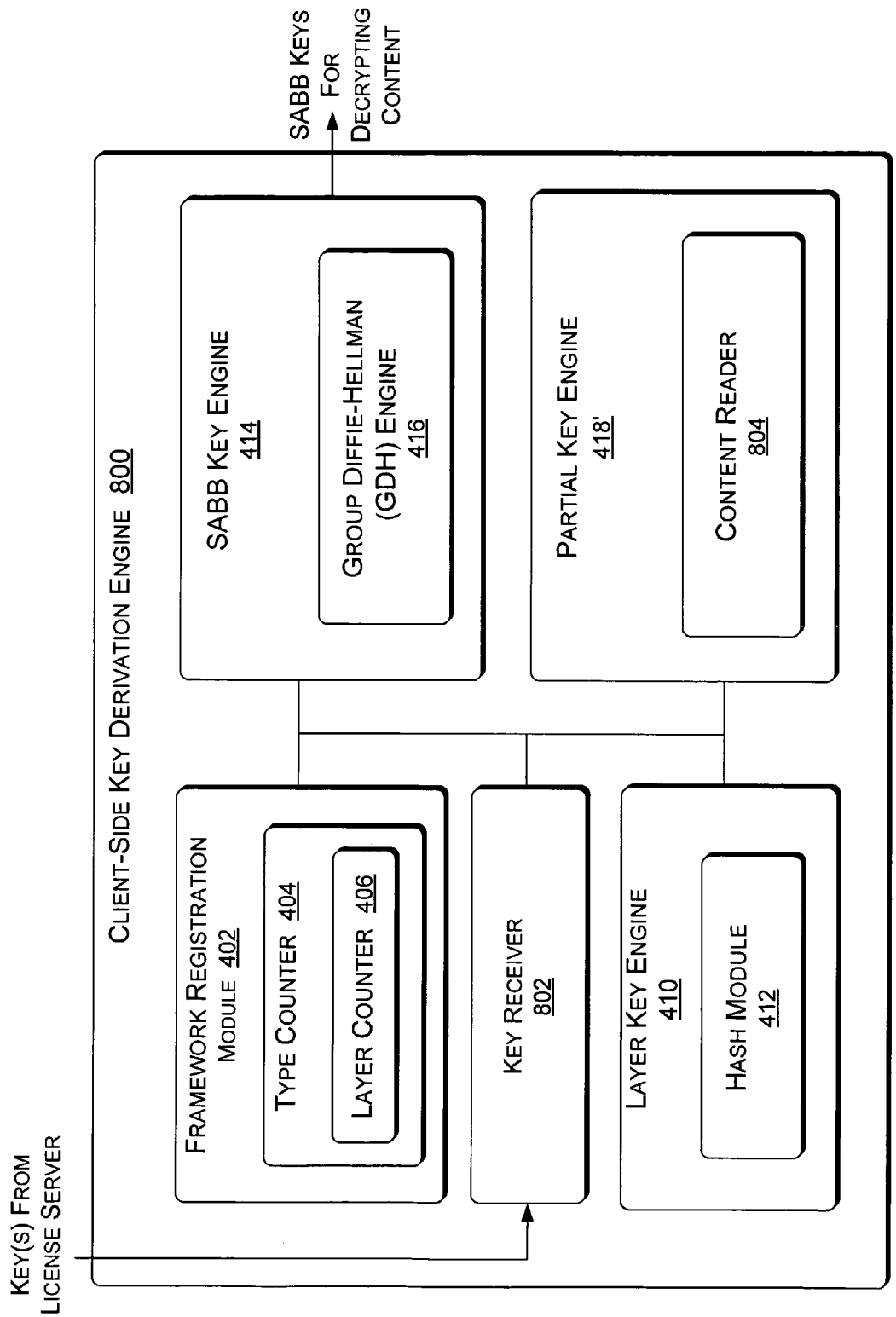
FIG. 8 is a block diagram of an exemplary client side key derivation engine.

FIG. 8 shows an exemplary client side key derivation engine 800 to derive SABB keys from a key or keys received in a license 706. A client-side key derivation engine 800 has many of the same components as the server side key derivation engine of FIG. 4, since both sides may perform key derivation from highest layer keys of subscribed types, however, no type key generator 408 is needed as type keys are not generated by a user. Instead a key receiver 802 may be included to read keys sent from a licensing engine 210. The partial key engine 418' may be modified from that of FIG. 4 to include a multimedia content reader 804. Partial GDH group key information included with multimedia content can be read or filtered out of a SLAC codestream 104' and interpreted, if needed, by the content reader 804. Since a client-side key derivation engine 800 does not need to embed or add partial keys to multimedia content the key combinations module 420 and anti-log module 422 of FIG. 4 are not needed on the client side.

Exemplary Key Schemata for SLAC Frameworks 100

The following description explains efficient SLAC key schemata in detail, especially as they relate to exemplary SLAC frameworks 100 and exemplary SLAC engines 204. Exemplary SLAC key schemata are efficient because they unlock the SABBs 110 of the various encrypted access layers 102 of a SLAC codestream 104 with as little key handling between server and client as possible. Thus, exemplary key schemata reduce the number of access keys that have to be stored and managed, for example, by a DRM license server 208.

In a SLAC codestream 104, higher quality layers use data of lower quality layers of the same type. Instead of sending numerous keys to an end user to unlock each of the lower quality layers to be depended on by a higher quality layer, only one key for the higher quality layer need be sent in some implementations. Keys for the lower quality layers can be derived from a key for the higher quality layer. Security is assured because knowledge of a key for one layer does not allow deduction of a key for a higher layer or a key for a layer of another access type. As already described, in some implementations, information used to derive a lower layer key from a higher layer key is included in the multimedia content itself.

A single, super-distributed SLAC codestream 104 also has the optional advantage of allowing free access to one or more of the low quality layers without any key being sent by the content owner to a consumer. This allows free advertising of the content of the SLAC codestream 104 and can also allow free data searching, indexing, and inventory of the content of the SLAC codestream while still maintaining control of the higher quality layers of the SLAC codestream 104, which can be licensed even as the codestream is being freely disseminated.

As mentioned with respect to FIG. 6, an independent random key $K_j$ is assigned to each access type, and therefore named as type key for that access type. In one implementation in which no virtual layer is used, a type key is equal to the key of the highest access layer (e.g. the best quality layer) of that access type being supported in a particular SLAC codestream 104. In another implementation where virtual layers are used, a type key is equal to the key of the virtual layer of that access type. In this case, a virtual layer is conceptually considered as the next higher layer of the highest access layer (e.g. the best quality layer) of that access type being supported in a particular SLAC codestream 104. This type key is then subjected to a cryptographic hash function "H" to generate layer keys for lower access layers of the same access type.

A key to encrypt (and decrypt) any particular SABB 110 data unit is generated with a Group Diffie-Hellman (GDH) key agreement by the keys of the access layers to which the data unit belongs. Since data of lower access layers is typically relied upon by higher layers, subscribing to a higher access layer may entail continued use of keys that are already in a user's possession for lower access layers, or may entail fresh key derivation for access layers that are lower than the access layer presently being licensed to the user.

In order to show how data (i.e., SABBs 110) supporting multiple access types might be disposed in an exemplary SLAC framework 100 for purposes of calculating keys to derive, FIG. 9 shows various exemplary SLAC frameworks 900, 908, 914 that each support a different number of access types. If there is some correlation in data utilization between access types, then the same data to be used by both access types tends to reside in SABBs that are located near each other along a diagonal of an exemplary SLAC framework (e.g., 908, 914), leaving some SABB locations in each SLAC framework empty.

A first SLAC framework 900 provides support for only one access type having an unencrypted base layer 902 and four encrypted access layers 904 for the one access type. In this case, a SABB (e.g., 906) needs only one layer key in order to be decrypted. The layer key can be hashed from a type key, i.e. the highest access layer of the one access type. The key of the highest subscribed layer is sent in a license to the user.

A second exemplary SLAC framework 908 provides support for two access types. The first access type has five access layers and the second access type has four access layers. In this case, some of the access layers rely on SABBs 910 that may lie in proximity to each other but with one on a higher framework level and one on a lower framework level.

The SABBs in the SLAC framework 908 are disposed along a diagonal of the framework 908 if there is correlation in data use between access types supported. For example, perhaps the access types are bit rate, and PSNR. Then data for the correlated access types tend to cluster near a diagonal of the structure leaving empty SABB locations 912 in the framework.

A third SLAC framework 914 provides support for three access types. The first access type has five access layers, the second access type has four access layers, and the third access type has three access layers. In this case too, data for the correlated access types may tend to cluster near a diagonal of the structure leaving empty SABB locations 916 in the framework 914. The data clustering results in key derivation not having to proceed to the derivation of keys for every possible SABB location in an SLAC framework 914, as many of the SABB locations may contain no data.

Exemplary Key Derivation Technique

In some implementations, an index of layers is included in the SLAC codestream 104, e.g., for user by the framework registration module 402. For access layers of the same type within a SLAC framework 100, a higher layer on an index of layers denotes higher access privilege. A higher layer can access lower layers of the same type, but not vice versa. For example, if $L_{i,j}$ denotes the $i^{th}$ access layer of $j^{th}$ access type, then a layer $L_{b,j}$ can derive all the keys for the lower layers $\{L_{i,j}|i<b\}$ of the same type.

Suppose there are n different access types, and $n_j$ number of layers (including the virtual layer if virtual layers are used in an implementation) for the j-th access type in a SLAC codestream, e.g., selected by the content publisher. With respect to a selected SLAC framework geometry, the type key generator 408 assigns an independent random key $\{K_{m_j,j}:=K_j|1\leq j\leq n\}$ to the highest layer (or the virtual layer if virtual layers are used) of each access type. This key serves as the type key. Keys for other access layers are derived by a layer key engine 410 from the type keys, according to Equation (1), where H is a cryptographic hash function:

$$K_{i,j}=H^{n_j-i}(K_j), 1\leq i\leq n_j \qquad (1)$$

A SABB 110, described above as the most fundamental data building block in a SLAC framework 100, can be uniquely identified by a set $\Gamma$ of access layers $L_{i_1,1}, \ldots, L_{i_j,j}, \ldots, L_{i_n,n}$ wherein each access type contributes one of the layers of the SABB 110, where $1\leq i_j\leq n_j$, $1\leq j\leq n$. In some cases, a set $\Gamma$ may not contain any actual access layers for an access type. In those cases, the set $\Gamma$ contains the virtual layer of the access type instead. Sometimes, a SABB 110 within a SLAC codestream 104 can correspond closely to a conventional unencrypted SBB 108, depending on how access types are specified by the publisher.

Each SABB set $\Gamma$ is encrypted by a corresponding SABB key $SK_\Gamma$ that is generated from the individual layer keys of the layers in $\Gamma$, as in Equation (2):

$$SK_\Gamma=\alpha^{\Pi K_{i,j}|K_{i,j}\in\Gamma}. \qquad (2)$$

Symmetric encryption is used in a SLAC framework 100 to encrypt each SABB 110 so that both the encryption key and the decryption key for a SABB $\Gamma$ are described by Equation (2) above.

Depending on the kind of multimedia, the level of security, and the scalable coder being used with an exemplary SLAC framework 100, an encryption engine 310 can employ known encryption techniques to do the low level encrypting of a SABB 110 once keys are generated. For example, a SABB 110 may be partitioned into even smaller data units and each unit may be encrypted independently. In some implementations a SABB 110 can be partitioned into video packets and the data in each video packet can be encrypted independently with a known encryption algorithm.

The selection of a SABB encryption algorithm for use in the encryption engine 310 of a SABB encrypter 308 may affect the scalable granularity of an encrypted SLAC codestream 104. Some encryption algorithms generate format-compliant codestreams after encryption that preserve all the original scalable granularity of the scalable coder used. Other encryption algorithms result in non-format-compliant codestreams after encryption with coarser scalable granularity than the original scalable coder. This factor may be considered in the selection of an encryption algorithm for encrypting SABBs 110 in a SLAC framework 100.

Exemplary SLAC key schemata facilitate easy switching from a low access layer to a higher access layer for an end user of an exemplary SLAC codestream 104. Simple download of a new license (sometimes with additional data, especially in the case of streaming media) is sufficient to switch to a higher access layer. The already-licensed data of the lower layers can continue to be used when accessing the higher layer.

Key Management within License Servers 210

Key management plays an important role in a DRM system. A license server 208 tries to store and manage as few keys as possible for licensing out access to the access types and access layers of each protected multimedia file. In an exemplary SLAC framework 100, a license server 208 stores "n" type keys for each media file (assuming re-keying is not used), one type key for each access type supported by a SLAC codestream 104. Keys for the various access layers can be regenerated from the relevant type keys. In one implementation, a license server 208 may elect to store more intermediate keys, as represented by Equation (2) in order to reduce mathematical computation performed to derive lower keys from higher keys on the fly when packaging a license for an end user.

Keys to be sent to a hypothetical end user "Alice" vary according to the access types that Alice wishes to acquire. A user typically subscribes to fewer access types than the number of access types that a SLAC codestream 104 has been set up (by a content provider) to support. For example, in a SLAC J2K system, Alice may acquire a right to access a J2K image via one access type, for instance, at a certain resolution layer $L_{b,resolution}$. In one implementation, the access types that Alice acquires a right to decrypt are denoted as $AT_{Alice}$, and the rest of the access types not acquired by Alice are denoted as "do-not-care" types: $NT_{Alice}$. In the present J2K example, $AT_{Alice} = \{L_{b,resolution}\}$ where $1 \leq b \leq n_{resolution}$, and $NT_{Alice}$ contains all the leftover access types that the content publisher selects for a SLAC codestream 104 to support, except for the resolution access type for which Alice has permission.

In one implementation, the acquired type(s), $AT_{Alice}$, contain a specific layer index for each access type in $AT_{Alice}$. In fact, the term $AT_{Alice}$ can play a dual role. It can indicate licensed access types as well as the specific access layers of these access types for which Alice has acquired access rights.

When a license is generated by a licensing engine 210 for Alice, it contains the keys "$SK_{Alice}$" for the layers specified by $AT_{Alice}$, that is, the set of layers for which Alice has access, as in Equation (3):

$$SK_{Alice} = \{K_{i,j} | L_{i,j} \in AT_{Alice}\}, \quad (3)$$

The license may also include anti-logarithms of the layer keys of all valid combinations of the layers of the access types in $NT_{Alice}$:

$$PK_{Alice}\{\alpha^{\Pi K_{i,j}} | j \in NT_{Alice}, 1 \leq i \leq n_j\}. \quad (4)$$

In one implementation, a client-side key derivation engine 800 on Alice's side extracts the layer keys in $SK_{Alice}$ and the GDH partial group key anti-logarithms in $PK_{Alice}$ from the license to calculate the decryption keys for the SABBs that Alice can access, according to Equation (2).

In another implementation, for some combinations of access types that a content publisher selects for a SLAC codestream 104 to support, a key combinations module 420 of a partial key engine 418 packages the GDH partial group key anti-logarithms of Equation (4) for many or all of the particular combinations of access types within the protected multimedia content itself rather than inside a separate license. This facilitates, as mentioned above, distributing protected content by super-distribution, which is a much more efficient distribution mechanism than individually distributing content associated with a particular license with that license, or distributing a plethora of keys.

In implementations in which the GDH partial group key anti-logarithms PK are included with super-distributed multimedia content, a license to Alice need only contain key(s) $SK_{Alice}$ representing the highest layer key(s) to which Alice has access. This ability to send a reduced number of keys corresponding to the highest layer subscribed to within a given access type greatly reduces the size of user licenses and the workload of license servers 208. For example, if user Alice has subscribed to only one access type, then the following GDH partial group key anti-logarithms:

$$PK = \{\alpha^{\Pi_{1 \leq j \leq n, j \neq k} K_{i,j}} | 1 \leq i \leq n_j, 1 \leq k \leq n\} \quad (5)$$

can be packaged with the encrypted multimedia content. The licensing engine 210 needs to send only one key to Alice for the highest access layer that she has rights to, and lower layer keys can be quickly derived. SABB keys used to decrypt the accessible SABBs can be derived with the layer keys in the license or derived and the included anti-logarithms. It is worth noting that a hash operation, such as that of Equation (1), may still need to be performed on the client side by a hashing module 412, but this is typically very fast and does not cause performance degradation.

If only a single access type is supported in a SLAC codestream 104, then a SABB key $SK_j$ is the same as a layer key, as in SLAC framework 900 of FIG. 9, and Equations (2), (4), and (5) are not needed in that case.

SLAC Security

The one-directional access feature of SLAC frameworks 100, that a higher layer can access lower layers of the same type but not vice versa, is guaranteed by one-way cryptographic hash functions H used in Equation (1). Since a type key generator 408 assigns completely different and independent random type keys to type keys from which other keys are derived, and since solving a generalized discrete logarithm problem is difficult or impossible, knowledge of one layer key does not allow deduction of layer keys of other types.

A GDH engine 416 implementing SABB key generation from access layer keys via a GDH key agreement as in Equation (2) imparts security to SABB keys that is proved, e.g., by the Combinational Diffie-Hellman assumption and the Decisional Diffie-Hellman assumption.

In a variation, a SABB key engine 414 and/or a partial key engine 418 may replace the discrete anti-logarithm calculations of Equations (2), (4), and (5) with their elliptic curve counterparts (i.e., Elliptic Curve-based Diffie-Hellman (ECDH)).

Exemplary SLAC Systems: J2K

Exemplary SLAC frameworks can work with many known and proposed scalable coders, for example, with J2K codestreams, the MPEG FGS (Fine Granularity Scalability), and USVC.

A J2K image codestream is organized in a hierarchical manner with structural elements of tiles, components, resolution levels, precincts, layers, and packets. Under the J2K standard, a packet is the fundamental building block, which can be uniquely identified by tile, components, resolution level, precincts, and layer. Typical J2K requests are resolution-level requests, J2K layer requests, and sometimes component requests.

Suppose that a content publisher has decided to support resolution-level requests and layer requests in an exemplary J2K SLAC codestream, i.e., n=2 access types. If j=1 denotes the resolution access type which has $n_1$ resolution levels, and j=2 denotes the J2K layer access type which has $n_2$ J2K layers, then there are $n_1 \times n_2$ SABBs in the associated SLAC framework. Each SABB consists of one or more J2K packets. In this case, Equation (2) is the basic Diffie-Hellman key agreement.

If no user is allowed to have multi-parameter requests (i.e., an access by specifying more than one parameter), for example, user Alice acquires a right to access resolution levels up to the $m^{th}$ resolution level, then the layer key $SK_{Alice} = \{K_{m,1}\}$ from Equation (3) and $$PK_{Alice} = \{\alpha^{K_{1,2}}, \cdots, \alpha^{K_{n_2,2}}\}$$

from Equation (4) are packaged in the license to be sent to Alice. An alternative approach is for a partial key engine 418 to package $$PK = \{\alpha^{K_{1,1}}, \cdots, \alpha^{K_{n_1,1}}; \alpha^{K_{1,2}}, \cdots, \alpha^{K_{n_2,2}}\}$$

from Equation (5) with the J2K encrypted content along with the Diffie-Hellman $G_q$ parameters q, α, etc. In this latter approach, only $SK_{Alice}=\{K_{m,1}\}$ is contained in the license sent to Alice.

If multi-parameter requests are allowed, for example, Alice acquires a right to access resolution levels up to the $m_1{}^{th}$ resolution level and J2K layers up to the $m_2{}^{th}$ J2K layer, then the layer keys $SK_{Alice}=\{K_{m_1,1}, K_{m_2,2}\}$ from Equation (3) are sent in a license to Alice but no partial GDH group keys are sent ($PK_{Alice}=\phi$).

Exemplary SLAC Systems: MPEG-4 FGS and USVC

The SMLFE techniques for MPEG-4 FGS define two mutually-exclusive access types: the bit rate access type and the PSNR access type. A partial key engine 418 packages GDH partial group key anti-logarithms PK from Equation (5) with encrypted multimedia content along with the GDH $G_q$ parameters q, α, etc. FGS also supports temporal scalability, and USVC supports both the temporal and the spatial scalabilities. For the MPEG-4 FGS, an exemplary SLAC engine 204 can support up to three access types, PSNR, bit rate, and temporal; and for USVC, an exemplary SLAC engine 204 can support up to four access types, PSNR, bit rate, temporal, and spatial. A SABB encrypter 308 encrypts SABBs in these cases using encryption techniques described above with respect to the encryption engine 310.

In an exemplary SLAC framework 100, three access types, PSNR (j=1), bit rate (j=2), and temporal (j=3) are supported in an MPEG-4 FGS system, i.e., n=3. As in SMLFE, the PSNR type and the bit rate type are mutually exclusive, i.e., the same client is not allowed a right of access to a representation specified by both a PSNR layer and a bit rate layer, since these two types are designed to address different needs. In this case, a partial key integrator 312 packages the anti-logarithms $$PK = \{\alpha^{K_{1,1}}, \cdots, \alpha^{K_{n_1,1}}; \alpha^{K_{1,2}}, \cdots, \alpha^{K_{n_2,2}}\}$$

from Equation (5) with the encrypted multimedia content. If user Alice acquires a right to access a representation specified by two access type parameters, say a PSNR layer b and a temporal layer c, then $SK_{Alice}=\{K_{b,1}, K_{c,3}\}$ from Equation (3) and no partial GDH group key anti-logarithms ($PK_{Alice}=\phi$) are sent in a license to Alice. Note that $PK_{Alice}$ is empty because the anti-logarithms from Equation (4) have already packaged in encrypted multimedia content by the partial key integrator 312 and delivered to Alice.

Exemplary SLAC Methods

Figure 10:
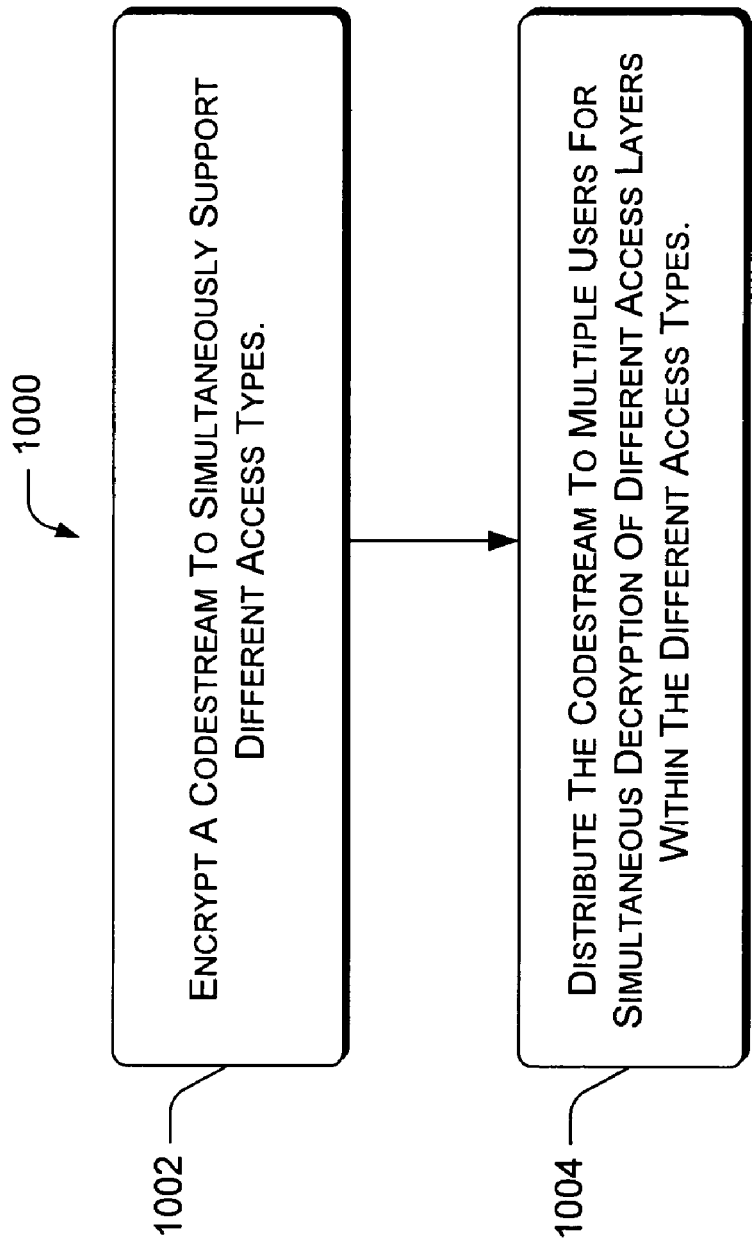
FIG. 10 is a flow diagram of an exemplary method of generating an encrypted scalable access layered multimedia codestream.

FIG. 10 shows in flow diagram style an exemplary method 1000 of generating an encrypted scalable access layered multimedia codestream. In the flow diagram, the operations are summarized in individual blocks. The method 1000 may be performed by hardware, software, or combinations of both, for example, by an exemplary SLAC engine 204.

At block 1002, a codestream is encrypted to simultaneously support a flexible number of different types of access to encrypted multimedia content and multiple degrees of access within each different type of access. An exemplary SLAC engine 204 allows a content owner selection of a custom SLAC framework for a SLAC codestream that can support a user-selectable number of access types and a user-selectable number of access layers within each access type. Different end users can simultaneously decrypt the same SLAC codestream by different access types and different access layers.

At block 1004, the codestream is distributed to multiple users for simultaneous decryption of different degrees of access within the different types of access. A licensing engine 210 may send the highest layer key for each subscribed access type to an end user so that the end user can derive all decryption keys within the user's license rights. Alternatively, a licensing engine 210 may send the user only one key, and include key content of other intermediate keys needed to decrypt multimedia content in the multimedia content itself.

Figure 11:
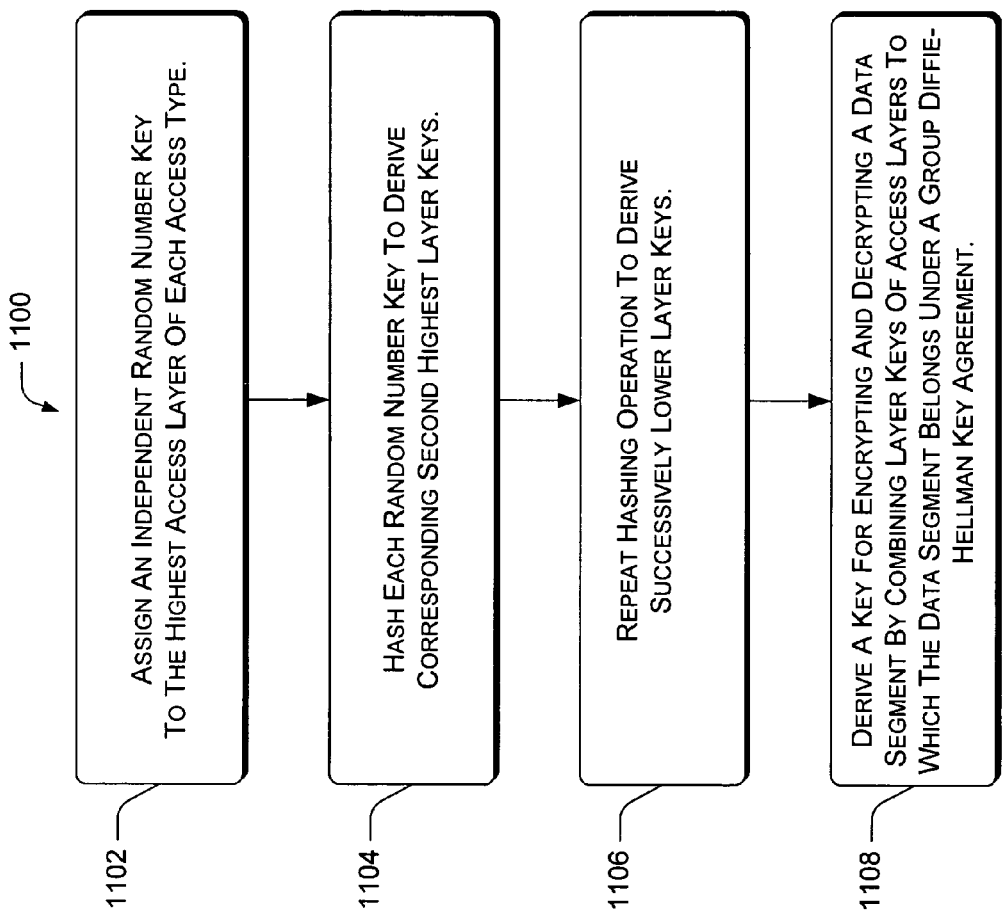
FIG. 11 is a flow diagram of an exemplary method of generating an exemplary SLAC key set.

FIG. 11 shows an exemplary method 1100 of generating an exemplary SLAC key set for encrypting and selectively decrypting data of the various access types and access layers of a SLAC codestream. In the flow diagram, the operations are summarized in individual blocks. The method 1100 may be performed by hardware, software, or combinations of both, for example, by an exemplary SLAC engine 204.

At block 1102, an independent random number "type" key is assigned, e.g., by a key derivation engine 318, to each access type selected by a content owner for a SLAC codestream. In one implementation, a random number type key is assigned to the highest access layer of each access type. Since the random numbers are independent and random, there is no way to derive one type key from another. Likewise, when lower keys are derived from the type keys, there is no way to derive a key under one type key from a key under a different type key.

At block 1104, the type keys are hashed, if needed, to derive corresponding layer keys for the highest access layers if virtual layers are used or the second highest access layers otherwise of the access types. The type keys are hashed when deriving keys for encrypting the multimedia content and the highest layer keys subscribed to are also hashed on the client side, e.g., by a client side key derivation engine 800, to derive decryption keys for SABBs.

At block 1106, results of previous hashing operations are successively hashed, if needed, to derive layer keys for successively lower access layers. An index may be provided with the codestream to indicate to a framework registration module 402 the extent of the access layers for an access type. Cryptographic hash functions are used so that a lower access layer cannot derive the layer key for a higher access layer by reversing the hash.

At block 1108, the layer keys of access layers to which a data segment belongs—which have been derived in previous block 1106—are combined using a Group Diffie-Hellman key agreement protocol in order to derive a group key for encrypting and decrypting the data segment. The GDH key agreement allows secure derivation of decryption keys on the client side by combination of layer keys, without having to maintain security by sending decryption keys for nearly every possible data segment in every licensed access layer.

Figure 12:
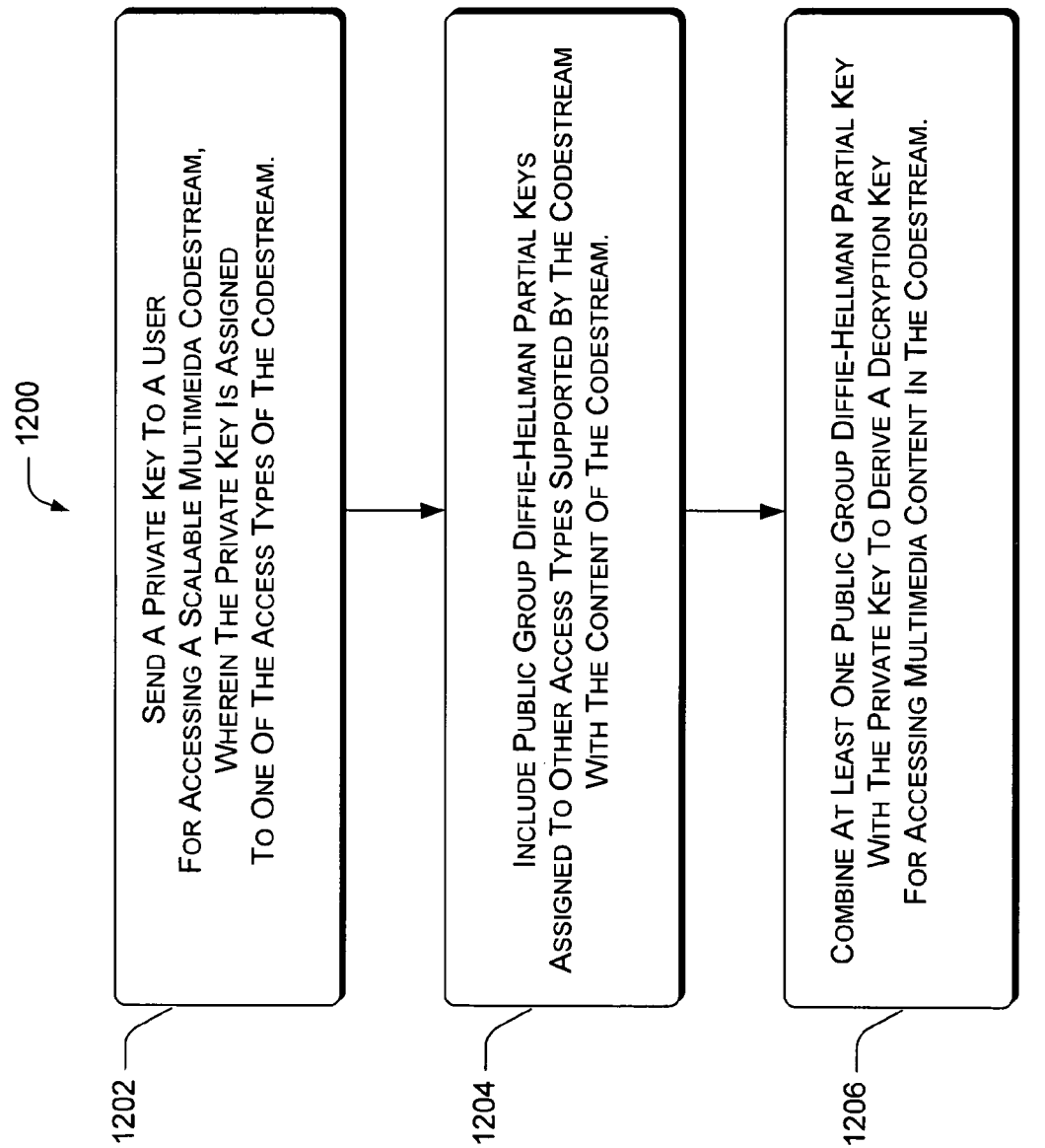
FIG. 12 is a flow diagram of an exemplary method of distributing SLAC key information to users.

FIG. 12 shows an exemplary method 1200 of distributing SLAC key information to users in order to reduce the number of keys to be sent to users in licenses. In the flow diagram, the operations are summarized in individual blocks. The method 1200 may be performed by hardware, software, or combinations of both, for example, by an exemplary SLAC engine 204.

At block 1202, a key is privately sent to a client, e.g., in a license, for deriving decryption keys to access multimedia content of a particular access type.

At block 1204, partial Group Diffie-Hellman key information associated with access of other access types supported by the codestream is included for public distribution in the codestream. The GDH agreement allows secret keys to be established over a public and insecure medium, in this case, the publicly disseminated copy of the SLAC codestream. In other words, key handling can be reduced by sending the least number of essential keys to a client and sending the rest of the key information needed to derive decryption keys in the publicly disseminated multimedia content itself. The GDH protocol ensures that the public information in the multimedia content is unusable without the key sent privately to the client.

At block 1206, at least one partial Group Diffie-Hellman key or key information, such as an anti-logarithm derived from the key, is combined with the key sent privately at block 1202 to derive a group key for decrypting the licensed multimedia content. A GDH engine 416 can be used to combine layer key information (of each access type) for the access layers on which the multimedia content resides to derive a group key for decryption of a SABB.

Recapitulation of SLAC

The exemplary SLAC frameworks described above exploit the unique features of scalable coders, and support different access types and multiple access layers for each type within a single encrypted codestream. The various access types and access layers are unlocked with an exemplary system of keys.

Exemplary SLAC key schemata are designed to reduce the number of keys to be stored and managed by a license server. The scalable granularity of a SLAC codestream depends on the encryption algorithm selected to encrypt SABBs, the basic data building blocks of a SLAC system. The scalable granularity can be as fine as the original scalable coder, or at a courser block-level. Low-quality representations can be unencrypted to enable content-based retrieval and free preview. SLAC codestreams work with most known and proposed scalable multimedia coders, such as J2K, MPEG-4 FGS, and USVC.

CONCLUSION

The foregoing describes exemplary scalable layered access control (SLAC) frameworks, codestreams, data building blocks (SABBs), engines, and methods. It should be noted that the subject matter described above can be implemented in hardware, in software, or in both hardware and software. In certain implementations, the exemplary schemata, engines, and methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A bitstream encryption framework, comprising:
    a flexible number of dimensions for encrypting or scrambling at least some data in a bitstream, each dimension representing a different access type by which the data is capable of being accessed;
    a flexible number of access layers for each dimension, each access layer representing a degree of access within an access type, wherein at least one of the access types is associated with a first access layer yielding multimedia content having a greater quality than a second access layer yielding the multimedia content;
    data segments for containing data, wherein a data segment is defined by intersecting access layers of the different access types; and
    a virtual layer not physically accessible by a user and treated as a higher access layer than a highest access layer of that access type.

2. The bitstream encryption framework as recited in claim 1, wherein some of the access layers are encrypted or scrambled and some of the access layers are unencrypted or unscrambled for free access by a user.

3. The bitstream encryption framework as recited in claim 1, wherein some of the data segments are unencrypted or unscrambled.

4. The bitstream encryption framework as recited in claim 1, wherein a data segment represents a common segment of multiple access layers, wherein the multiple access layers include one access layer of each access type.

5. The bitstream encryption framework as recited in claim 4, wherein the data segment is capable of containing encrypted data common to multiple access layers, wherein the multiple access layers include one access layer of each of the access types.

6. The bitstream encryption framework as recited in claim 1, wherein a number of flexible access types and a number of flexible access layers for each access type are selectable prior to distributing data in the bitstream.

7. The bitstream encryption framework as recited in claim 6, further comprising a dimension key for each dimension, wherein a dimension key is capable of being hashed into a set of layer encryption keys for the access layers of the corresponding dimension.

8. The bitstream encryption framework as recited in claim 6, wherein each dimension key comprises an independent random number.

9. The bitstream encryption framework as recited in claim 6, wherein a layer encryption key is capable of participating in encryption of an associated data segment and the layer encryption key is capable of participating in decryption of the associated data segment.

10. The bitstream encryption framework as recited in claim 6, further comprising a data segment key, wherein the data segment key is generated by Group Diffie-Hellman agreement of layer encryption keys associated with the intersecting access layers.

11. The bitstream encryption framework as recited in claim 10, wherein the multiple access layers include one access layer of each access type.

12. The bitstream encryption framework as recited in claim 10, wherein some of the layer encryption keys for generating the data segment encryption key are included in data of the bitstream as public key information that cannot be reversed into the layer encryption keys, and wherein a data segment decryption key can be derived from the public key information using at least one private access layer key but the data segment decryption key cannot be derived from the public key information without a private access layer key.

13. The bitstream encryption framework as recited in claim 12, wherein the layer encryption key information includes an anti-logarithm comprising a Diffie-Hellman generator value raised to the power of a value of at least one of the layer encryption keys.

14. The bitstream encryption framework as recited in claim 10, wherein at least some of the layer encryption keys for generating the data segment encryption key are sent in a license to a receiver of the bitstream.

15. The bitstream encryption framework as recited in claim 10, wherein at least one of the layer encryption keys for generating the data segment encryption key are derivable by hashing a dimension encryption key.

16. The bitstream encryption framework as recited in claim 10, wherein a data segment encryption key is capable of decrypting its corresponding data segment.

17. A scalable layered access framework for the data of an encrypted multimedia codestream, comprising:
   for each of multiple types of access to the codestream, a set of data layers representing degrees of access to the codestream within a type of access;
   a framework dimension for each type of access to the codestream, wherein the data layers representing degrees of access are disposed in an order along one of the dimensions associated with a type of access, wherein at least one of the access types is associated with a first access layer yielding multimedia content having a greater quality than a second access layer yielding the multimedia content;
   scalable access building blocks for encrypting and decrypting the data of the codestream, wherein a scalable access building block is a data segment described by intersections of some of the data layers disposed along the dimensions; and
   a virtual layer not physically accessible by a user and treated as a higher access layer than a highest access layer of that access type.

18. The scalable layered access framework as recited in claim 17, wherein the framework is scalable to include additional degrees of access for a type of access and is scalable to include additional types of access.

19. The scalable layered access framework as recited in claim 17, wherein a random number key assigned to each type of access is capable of being hashed to derive layer keys representing the degrees of access.

20. The scalable layered access framework as recited in claim 19, wherein a key for decrypting a scalable access building block is derived by Group Diffie-Hellman key agreement from layers keys for the data layers to which the scalable access building block belongs.

21. The scalable layered access framework as recited in claim 19, wherein a key for decrypting a scalable access building block is derived by Group Diffie-Hellman key agreement from layers keys for the data layers which intersect to form the scalable access building block.

22. An encrypted scalable layered access multimedia codestream, comprising:
   multimedia content encrypted for simultaneous access by multiple access types and by multiple access layers within each access type, wherein the codestream is capable of being transcoded and rate-shaped without decryption of the multimedia content.

23. The encrypted scalable layered access multimedia codestream as recited in claim 22, wherein access types and access layers within the codestream can be determined without decrypting the codestream.

24. The encrypted scalable layered access multimedia codestream as recited in claim 22, further comprising public key information capable of being combined with a private key associated with one of the access layers of the codestream to selectively decrypt the access layer.

25. The encrypted scalable layered access multimedia codestream as recited in claim 24, wherein the partial Group Diffie-Hellman group keys are included in the encrypted multimedia content as anti-logarithms.

26. A scalable access building block for an encrypted scalable layered access multimedia codestream, comprising:
   a set of data layers for each of multiple types of access to the codestream, representing degrees of access to the codestream within a type of access;
   a framework dimension for each type of access to the codestream, wherein the data layers representing degrees of access are disposed in an order along one of the dimensions associated with a type of access, wherein at least one of the access types is associated with a first access layer yielding multimedia content having a greater quality than a second access layer yielding the multimedia content;
   a data segment of multimedia content capable of being decrypted by a Diffie-Hellman agreement of layer keys associated with access layers to which the data segment belongs, wherein the codestream consists of multiple scalable access building blocks providing multiple types of access to the codestream and multiple access layers within each type of access; and
   a virtual layer not physically accessible by a user and treated as a higher access layer than a highest access layer of that access type.

27. The scalable access building block as recited in claim 26, wherein the layer keys for a type of access are hashed from random number keys assigned to each type of access.

28. The scalable access building block as recited in claim 26, wherein the boundaries of the data segment are determined by intersection of access layers within a multi-dimensional matrix of access layers arranged along access type dimensions.

29. A scalable layered access control engine, comprising:
   a scalable layered access framework, comprising:
      a set of data layers for each of multiple types of access to the codestream representing degrees of access to the codestream within a type of access;
      a framework dimension for each type of access to the codestream, wherein the data layers representing degrees of access are disposed in an order along one of the dimensions associated with a type of access, wherein at least one of the access types is associated with a first access layer yielding multimedia content having a greater quality than a second access layer yielding the multimedia content, the codestream simultaneously accessible via different access types and access layers on a plurality of different equipment; and
      scalable access building blocks for encrypting and decrypting the data of the codestream, wherein a scalable access building block is a data segment described by intersections of some of the data layers disposed along the dimensions; and
      a virtual layer not physically accessible by a user and treated as a higher access layer than a highest access layer of that access type;
   a key engine to assign random number keys to each access type of an encrypted layered access codestream, wherein the codestream supports a variable number of multiple access types;
   a key derivation engine associated with the key engine to derive layer keys for the access layers by iteratively hashing the random number keys;
   a Group Diffie-Hellman engine associated with the key derivation engine to derive a data segment key for encrypting and decrypting a data segment of the codestream by combining layer keys of access layers to which the data segment belongs in a Group Diffie-Hellman agreement; and an encrypter to encrypt the data segment using the data segment key.

30. The scalable layered access control engine as recited in claim 29, further comprising a licensing engine to send a key to a user to unlock the data segment.

31. The scalable layered access control engine as recited in claim 29, further comprising a partial key engine to include at least some of the keys for decrypting the data segment in the codestream as partial Diffie-Hellman group keys.

32. A scalable layered access control system, comprising:

means for encrypting a scalable codestream, wherein the codestream simultaneously supports different types of access to multimedia content and multiple degrees of access for each different type of access; and means for distributing the codestream to multiple users for selective decryption of different degrees of access of the different types of access, wherein at least one of the access types is associated with a first access layer yielding multimedia content having a greater quality than a second access layer yielding the multimedia content, the codestream simultaneously accessible via different access types and access layers on a plurality of different equipment.

33. The scalable layered access control system as recited in claim 32, further comprising means for selecting the multiple types of access and selecting a unique number of degrees of access for each of the multiple types of access to be supported by the scalable codestream.

34. The scalable layered access control system as recited in claim 32, further comprising means for licensing rights to decrypt various different types and degrees of access to multiple simultaneous users.

35. The scalable layered access control system as recited in claim 32, further comprising means for distributing to a user a key assigned to one type of access and means for hashing the key assigned to one type of access to obtain a layer encryption key for an access layer.

36. The scalable layered access control system as recited in claim 35, further comprising means for combining the layer encryption key with at least one other layer encryption key via a Group Diffie-Hellman agreement to obtain a data encryption key.

37. The scalable layered access control system as recited in claim 35, further comprising means for privately sending one key associated with one type of access to a user and means for publicly distributing key information for other keys associated with other types of access, wherein the privately sent key and the publicly sent key information are capable of being combined by a Group Diffie-Hellman agreement to derive the decryption key for a layer of access to the multimedia content.

38. The scalable layered access control system as recited in claim 37, further comprising means for sending the public key information as anti-logarithms.

39. A key schema for encrypting and decrypting a scalable layered access codestream, comprising:

encrypting or scrambling a flexible number of dimensions for at least some data in a codestream, each dimension representing a different access type by which the data is capable of being accessed, the codestream data simultaneously accessible via different access types and access layers on a plurality of different equipment;

creating a flexible number of access layers for each dimension, each access layer representing a degree of access within an access type, wherein at least one of the access types is associated with a first access layer yielding multimedia content having a greater quality than a second access layer yielding the multimedia content;

providing a plurality of data segments for containing data, wherein a data segment is defined by intersecting access layers of the different access types;

assigning an independent random number key to the highest access layer of each access type of an encryptable scalable codestream capable of simultaneously supporting multiple access types;

hashing each random number key to derive corresponding layer keys for second highest access layers of the access types;

successively hashing the results of each previous hashing to derive the next lower layer key; and combining the layer keys of the access layers to which a data segment belongs by a Group Diffie-Hellman key agreement in order to derive a key for encrypting and decrypting the data segment.

40. A scalable access building block key, comprising:

for each of multiple types of access to the codestream, a set of data layers representing degrees of access to the codestream within a type of access;

a framework dimension for each type of access to the codestream, wherein the data layers representing degrees of access are disposed in an order along one of the dimensions associated with a type of access, wherein at least one of the access types is associated with a first access layer yielding multimedia content having a greater quality than a second access layer yielding the multimedia content, the codestream simultaneously accessible via different access types and access layers on a plurality of different equipment; and a Group Diffie-Hellman value calculated for layer keys combined under Diffie-Hellman key agreement, wherein the layer keys correspond those access layers of an encrypted scalable layered access codestream in which the scalable access building block resides and wherein the layer keys are hashed from type keys for each access type supported by the codestream.

41. A set of keys for unlocking an encrypted scalable layered access codestream, comprising:

a flexible number of dimensions for encrypting or scrambling for at least some data in a codestream, each dimension representing a different access type by which the data is capable of being accessed, the codestream data simultaneously accessible via different access types and access layers on a plurality of different equipment;

a flexible number of access layers for each dimension, each access layer representing a degree of access within an access type, wherein at least one of the access types is associated with a first access layer yielding multimedia content having a greater quality than a second access layer yielding the multimedia content;

a virtual layer not physically accessible by a user and treated as a higher access layer than a highest access layer of that access type;

a plurality of data segments for containing data, wherein a data segment is defined by intersecting access layers of the different access types;

type keys corresponding to access types supported by the codestream;

layer keys derived from the type keys, wherein the layer keys correspond to access layers of the access types; and data segment keys derived from layer keys for access layers on which a data segment resides, where a data segment key is derived from layer keys by a Group Diffie-Hellman agreement.

42. The set of keys as recited in claim 41, wherein only type keys are sent to a user to derive the layer keys and data segment keys for unlocking content associated with an access layer of the codestream.

43. A computer readable medium containing instructions that are executable by a computer to perform actions, comprising:

selecting access types and access layers of the access types to be supported by an encrypted scalable layered multimedia stream, wherein the access layers represent degrees of access disposed in an order associated with a type of access, wherein at least one of the access types is associated with a first access layer yielding multimedia content having a greater quality than a second access layer yielding the multimedia content, the multimedia stream simultaneously accessible via different access types and access layers on a plurality of different equipment;

assigning an independent random access number key to a highest access layer each access type;

hashing each independent random access number key to derive layer keys for each second highest access layer of each access type;

successively hashing the results of a previous hash to derive layer keys for successively lower access layers;

locating access layers of each access type in which a segment of multimedia data to be encrypted resides;

combining layer keys of the located access layers by a Group Diffie-Hellman agreement to derive an encryption key for the segment of multimedia data; and encrypting the segment of multimedia data using the encryption key.

44. The computer readable medium as recited in claim 43, wherein an Elliptic Curve Diffie-Hellman protocol is substituted for the Group Diffie-Hellman key exchange protocol.

45. The computer readable medium as recited in claim 43, further comprising instructions for:

sending one of the keys used to derive a decryption key for the segment of multimedia data to a user in a license; and sending a remainder of keys used to derive the decryption key as publicly available anti-logarithms in the multimedia data.

* * * * *